(12) United States Patent
Franklin et al.

(10) Patent No.: US 10,063,510 B2
(45) Date of Patent: Aug. 28, 2018

(54) TECHNIQUES TO SHARE AND REMIX MEDIA THROUGH A MESSAGING SYSTEM

(71) Applicant: Facebook, Inc., Menlo Park, CA (US)

(72) Inventors: Alexander Salem Franklin, Cupertino, CA (US); Matthew Steiner, Los Altos, CA (US)

(73) Assignee: FACEBOOK, INC., Menlo Park, CA (US)

( * ) Notice: Subject to any disclaimer, the term of this patent is extended or adjusted under 35 U.S.C. 154(b) by 87 days.

(21) Appl. No.: 14/667,576

(22) Filed: Mar. 24, 2015

(65) Prior Publication Data

US 2016/0285808 A1 Sep. 29, 2016

(51) Int. Cl.
*H04L 12/58* (2006.01)

(52) U.S. Cl.
CPC .............. *H04L 51/18* (2013.01); *H04L 51/06* (2013.01); *H04L 51/16* (2013.01)

(58) Field of Classification Search
CPC .......... H04L 51/18; H04L 51/06; H04L 51/16
See application file for complete search history.

(56) References Cited

U.S. PATENT DOCUMENTS

| | | |
|---|---|---|
| 8,026,805 B1 | 9/2011 | Rowe |
| 8,332,512 B1 | 12/2012 | Wu et al. |
| 9,444,897 B1 | 9/2016 | Bostick et al. |
| 2007/0266170 A1* | 11/2007 | Mockett ............. H04N 21/4622 709/231 |
| 2008/0068995 A1 | 3/2008 | Skog |
| 2008/0144784 A1 | 6/2008 | Limberg |
| 2009/0055511 A1 | 2/2009 | Berry et al. |
| 2009/0094248 A1 | 4/2009 | Petersen |
| 2009/0234935 A1* | 9/2009 | Watson ............... H04L 12/1822 709/219 |
| 2012/0271822 A1 | 10/2012 | Schwendimann et al. |
| 2012/0271882 A1 | 10/2012 | Sachdeva et al. |
| 2013/0111328 A1* | 5/2013 | Khanna ............... G06F 17/3089 715/234 |
| 2013/0226453 A1 | 8/2013 | Trussel et al. |
| 2013/0275419 A1 | 10/2013 | Li et al. |

(Continued)

OTHER PUBLICATIONS

O'Donoghue, "App deep linking: Do we really need Facebook App Links and similar services", mobiForge, Jan. 22, 2015, 8 pages.*

(Continued)

*Primary Examiner* — Brian J Gillis
*Assistant Examiner* — Amy Ling

(57) ABSTRACT

Techniques to share and remix media through a messaging system are described. Some embodiments are particularly directed to techniques to promote the sharing and remixing of media by promoting third-party sources of media content. In one embodiment, for example, an apparatus may comprise a media management component operative to receive a media element in a messaging application, the media element associated with a media application; and a messaging component operative to generate a message package, the message package comprising the media element, the message package comprising an attribution record for the media element, the attribution record comprising an inter-application link for the media element with the media application and transmit the message package to a messaging server. Other embodiments are described and claimed.

18 Claims, 16 Drawing Sheets

(56) References Cited

U.S. PATENT DOCUMENTS

| | | | |
|---|---|---|---|
| 2013/0339283 A1 | 12/2013 | Grieves et al. | |
| 2014/0095495 A1 | 4/2014 | Brukman et al. | |
| 2014/0136990 A1 | 5/2014 | Gonnen et al. | |
| 2014/0156746 A1 | 6/2014 | Wheatley | |
| 2014/0164478 A1 | 6/2014 | Kleppmann et al. | |
| 2014/0207863 A1 | 7/2014 | Steinberg et al. | |
| 2014/0244786 A1* | 8/2014 | Shapira | H04L 67/10 709/217 |
| 2014/0379823 A1 | 12/2014 | Wilsher et al. | |
| 2015/0019659 A1 | 1/2015 | Eidelson et al. | |
| 2015/0050993 A1 | 2/2015 | Blayer et al. | |
| 2015/0278906 A1 | 10/2015 | Navani et al. | |
| 2015/0331866 A1 | 11/2015 | Shen et al. | |
| 2015/0339295 A1* | 11/2015 | Snibbe | H04N 21/854 707/741 |

OTHER PUBLICATIONS

Extended European Search Report received for European Patent Application No. 15186724.9, dated Sep. 2, 2016, 8 pages.
Office Action received for U.S. Appl. No. 14/844,231, dated Oct. 21, 2016, 31 pages.
International Search Report and Written Opinion received for PCT Patent Application No. PCT/US2015/022375, dated Feb. 18, 2016, 6 pages.
Office Action received for U.S. Appl. No. 14/973,463, dated Dec. 15, 2017, 25 pages.

\* cited by examiner

*700*

Receive a media element in a messaging application, the media element associated with a media application.
*702*

Generate a message package, the message package comprising the media element, the message package comprising an attribution record for the media element, the messaging package comprising a destination user identifier.
*704*

Transmit the message package to a messaging server.
*706*

*FIG. 7*

TECHNIQUES TO SHARE AND REMIX MEDIA THROUGH A MESSAGING SYSTEM

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging applications, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to share and remix media through a messaging system. Some embodiments are particularly directed to techniques to promote the sharing and remixing of media by promoting third-party sources of media content. In one embodiment, for example, an apparatus may comprise a media management component operative to receive a media element in a messaging application, the media element associated with a media application; and a messaging component operative to generate a message package, the message package comprising the media element, the message package comprising an attribution record for the media element, the attribution record comprising an inter-application link for the media element with the media application and transmit the message package to a messaging server. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention, a computer-implemented method may comprise:

receiving a media element in a messaging application running on a client device of a user of a media messaging system, the media element associated with a media application, the media application installed on the client device as a distinct application from the messaging application;

generating a message package, the message package comprising the media element, the media element directly stored as computer data representation and/or as a reference, the message package comprising an attribution record for the media element, the attribution record comprising an inter-application link for the media element with the media application; and transmitting the message package from the client device to a messaging server for delivery to one or more other client devices of other users of the media messaging system.

In an embodiment according to the invention, which can be claimed as well, a computer-implemented method, may comprise:

receiving a media element in a messaging application, the media element associated with a media application;

generating a message package, the message package comprising the media element, the message package comprising an attribution record for the media element, the attribution record comprising an inter-application link for the media element with the media application; and transmitting the message package to a messaging server.

In an embodiment according to the invention, a computer-implemented method, the messaging application installed on a client device, the media application installed on the client device as a distinct application from the messaging application, further may comprise:

receiving a media package in the messaging application from the media application via inter-application communication on the client device, the media package comprising the media element and the inter-application link.

In an embodiment according to the invention, a computer-implemented method further may comprise:

extracting the media element from the received media package;

displaying a preview of the media element in the messaging application;

receiving a user media selection of the media element in the messaging application; and generating the message package comprising the media element in response to the user media selection of the media element within the messaging application.

In an embodiment according to the invention, a computer-implemented method further may comprise:

receiving a promoted media repository from a media server, the promoted media repository comprising a plurality of promoted media elements, the media element comprising one of the plurality of promoted media elements;

displaying one or more of the promoted media elements, the displayed one or more of the promoted media elements including the media element;

receiving a user media selection of the media element; and generating the message package comprising the media element in response to the user media selection of the media element.

In an embodiment according to the invention, a computer-implemented method further may comprise:

displaying the media element in a media element discovery section of the messaging application;

receiving a user media selection of the media element in the media element discovery section; and generating the message package comprising the media element in response to the user media selection of the media element.

In an embodiment according to the invention, a computer-implemented method, the message package associated with a message thread, further may comprise:

receiving a prior message package from the messaging server, the prior messaging package associated with the message thread, the prior message package comprising a prior media element, the prior media element associated with the media application, the prior message package comprising a prior attribution record, the prior attribution record comprising a prior inter-application link, the prior inter-application link identifying the prior media element within the media application;

displaying the prior media element in the message thread in association with an attribution display element for the media application;

receiving a user application launch command in association with the attribution display element;

launching the media application in response to the user application launch command;

transmitting the prior inter-application link to the media application;

transmitting a message thread inter-application link to the media application in association with the prior inter-application link;

receiving a media package in the messaging application from the media application, the media package comprising the media element and the message thread inter-application link associated with the message thread; and prompting inclusion of the media element in the message thread based on the message thread inter-application link being associated with the message thread.

In an embodiment according to the invention, a computer-implemented method, the messaging application executing on a client device, further may comprise:

determining that the media application is not installed on the client device; and initiating installation of the media application on the client device in response to the user application launch command.

In an embodiment according to the invention, a computer-implemented method further may comprise:

receiving a prior message package from the messaging server, the prior message package comprising a prior media element, the prior media element associated with a second media application;

displaying the prior media element;

receiving a user remix command in association with the displayed prior media element;

launching the media application in response to the user remix command;

transmitting the prior media element to the media application; and receiving the media element from the media application, the media element comprising a modified version of the prior media element.

In a further embodiment according to the invention, which can be claimed as well, an apparatus may comprise:

a processor circuit on a device;

a media management component operative on the processor circuit to receive a media element in a messaging application, the media element associated with a media application; and a messaging component operative to generate a message package, the message package comprising the media element, the message package comprising an attribution record for the media element, the attribution record comprising an inter-application link for the media element with the media application; and transmit the message package to a messaging server.

In an embodiment according to the invention, an apparatus, the messaging application installed on the device, the media application installed on the client device as a distinct application from the messaging application, further may comprise:

the media management component operative to receive a media package in the messaging application from the media application via inter-application communication on the client device, the media package comprising the media element and the inter-application link.

In an embodiment according to the invention, an apparatus further may comprise:

the media management component operative to receive a promoted media repository from a media server, the promoted media repository comprising a plurality of promoted media elements, the media element comprising one of the plurality of promoted media elements; display one or more of the promoted media elements, the displayed one or more of the promoted media elements including the media element; and receive a user media selection of the media element; and the messaging component operative to generate the message package comprising the media element in response to the user media selection of the media element.

In an embodiment according to the invention, an apparatus, the message package associated with a message thread, further may comprise:

the messaging component operative to receive a prior message package from the messaging server, the prior messaging package associated with the message thread, the prior message package comprising a prior media element, the prior media element associated with the media application, the prior message package comprising a prior attribution record, the prior attribution record comprising a prior inter-application link, the prior inter-application link identifying the prior media element within the media application;

the media management component operative to display the prior media element in the message thread in association with an attribution display element for the media application; receive a user application launch command in association with the attribution display element; launch the media application in response to the user application launch command; transmit the prior inter-application link to the media application; transmit a message thread inter-application link to the media application in association with the prior inter-application link; receive a media package in the messaging application from the media application, the media package comprising the media element and the message thread inter-application link associated with the message thread; and prompt inclusion of the media element in the message thread based on the message thread inter-application link being associated with the message thread.

In an embodiment according to the invention, an apparatus further may comprise:

the media management component operative to determine that the media application is not installed on the device; and initiate installation of the media application on the device in response to the user application launch command.

In an embodiment according to the invention, an apparatus further may comprise:

the messaging component operative to receive a prior message package from the messaging server, the prior message package comprising a prior media element, the prior media element associated with a second media application;

the media management component operative to display the prior media element; receive a user remix command in association with the displayed prior media element; launch the media application in response to the user remix command; transmit the prior media element to the media application; and receive the media element from the media application, the media element comprising a modified version of the prior media element.

In a further embodiment according to the invention, which can be claimed as well, at least one computer-readable storage medium may comprise instructions that, when executed, cause a system to:

receive a media element in a messaging application, the media element associated with a media application;

generate a message package, the message package comprising the media element, the message package comprising an attribution record for the media element, the attribution record comprising an inter-application link for the media element with the media application; and transmit the message package to a messaging server.

In an embodiment according to the invention, the at least one computer-readable storage medium, the messaging application installed on a client device, the media application installed on the client device as a distinct application from the messaging application, may comprise further instructions that, when executed, cause a system to:

receive a media package in the messaging application from the media application via inter-application communication on the client device, the media package comprising the media element and the inter-application link.

In an embodiment according to the invention, the at least one computer-readable storage medium may comprise further instructions that, when executed, cause a system to:

receive a promoted media repository from a media server, the promoted media repository comprising a plurality of promoted media elements, the media element comprising one of the plurality of promoted media elements;

display one or more of the promoted media elements, the displayed one or more of the promoted media elements including the media element;

receive a user media selection of the media element; and generate the message package comprising the media element in response to the user media selection of the media element.

In an embodiment according to the invention, the at least one computer-readable storage medium, the message package associated with a message thread, may comprise further instructions that, when executed, cause a system to:

receive a prior message package from the messaging server, the prior messaging package associated with the message thread, the prior message package comprising a prior media element, the prior media element associated with the media application, the prior message package comprising a prior attribution record, the prior attribution record comprising a prior inter-application link, the prior inter-application link identifying the prior media element within the media application;

display the prior media element in the message thread in association with an attribution display element for the media application;

receive a user application launch command in association with the attribution display element;

launch the media application in response to the user application launch command;

transmit the prior inter-application link to the media application;

transmit a message thread inter-application link to the media application in association with the prior inter-application link;

receive a media package in the messaging application from the media application, the media package comprising the media element and the message thread inter-application link associated with the message thread; and prompt inclusion of the media element in the message thread based on the message thread inter-application link being associated with the message thread.

In an embodiment according to the invention, the at least one computer-readable storage medium, the messaging application executing on a client device, may comprise further instructions that, when executed, cause a system to:

determine that the media application is not installed on the client device; and initiate installation of the media application on the client device in response to the user application launch command.

In an embodiment according to the invention, the at least one computer-readable storage medium may comprise further instructions that, when executed, cause a system to:

receive a prior message package from the messaging server, the prior message package comprising a prior media element, the prior media element associated with a second media application;

display the prior media element;

receive a user remix command in association with the displayed prior media element;

launch the media application in response to the user remix command;

transmit the prior media element to the media application; and receive the media element from the media application, the media element comprising a modified version of the prior media element.

In a further embodiment according to the invention, which can be claimed as well, a computer-implemented method may comprise:

receiving a media element in a messaging application, the media element associated with a media application;

generating a message package, the message package comprising the media element, the message package comprising an attribution record for the media element, the attribution record operative to configure a network component for the media application for network access to the media element on a media server; and transmitting the message package to a messaging server.

In a further embodiment according to the invention, which can be claimed as well, a computer-implemented method may comprise:

receiving a media package in a messaging application, the media package associated with a media application, the media package comprising a media element and a media service attribution record;

configuring a network component for the messaging application for network access to the media element on a media server based on the media service attribution record;

generating a message package, the message package comprising the media element, the message package comprising a media application attribution record for the media element, the media application attribution record comprising an inter-application link for the media element with the media application; and transmitting the message package to a messaging server.

In a further embodiment according to the invention, one or more computer-readable non-transitory storage media embody software that is operable when executed to perform a method according to the invention or any of the above mentioned embodiments.

In a further embodiment according to the invention, a system may comprise: one or more processors; and at least one memory coupled to the processors and comprising instructions executable by the processors, the processors operable when executing the instructions to perform a method according to the invention or any of the above mentioned embodiments.

In a further embodiment according to the invention, a computer program product, preferably comprising a computer-readable non-transitory storage media, is operable when executed on a data processing system to perform a method according to the invention or any of the above mentioned embodiments.

BRIEF DESCRIPTION OF THE DRAWINGS

FIG. 7 illustrates an embodiment of a logic flow for the media messaging system of FIG. 1.

DETAILED DESCRIPTION

Figure 1:
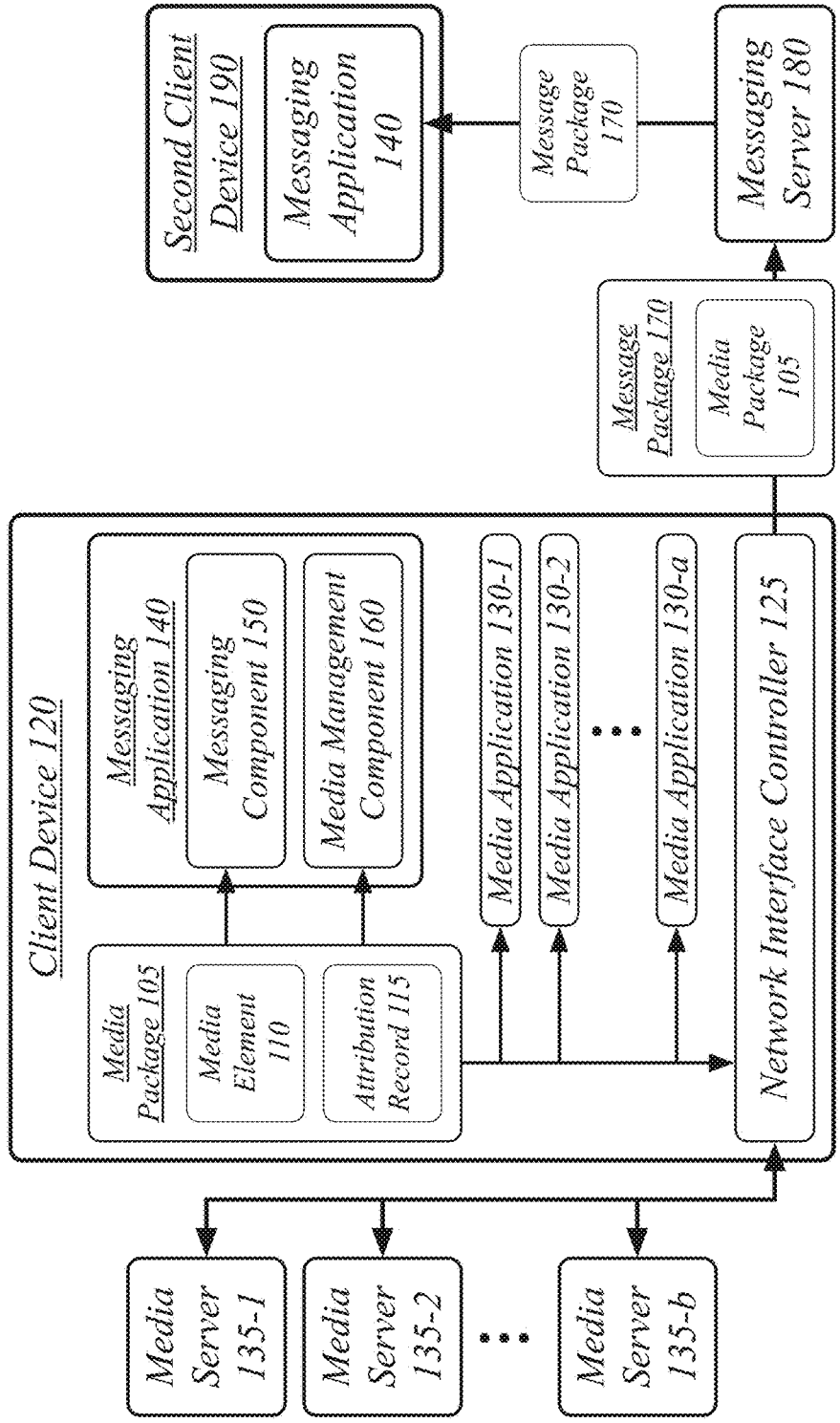
FIG. 1 illustrates an embodiment of a media messaging system.

People desire new and expressive ways to communicate. They look to media applications that grant them access to new media content and to new ways of creating and modifying content. While media discovery, creation, and modification tools may be incorporated within a messaging application, it may be impractical to match the creativity and breadth of media tools developed by the larger application development community. Instead, new and exciting media applications may be promoted and discovered through empowering users to share their content within their messaging conversations while providing attribution as to the source of the media. Users may be particularly excited to explore unfamiliar media applications when they are implicitly recommended through the attributed sharing of content by their friends. Users may experience an expanded connection to their new media applications by being empowered to easily share the content they discover and create in their preferred messaging application.

Users on mobile devices have access to a vast quantity of media content distributed through the Internet. Users may use a messaging application to communicate with friends, leveraging a wide variety of media applications to store, explore, and discover such media as photographs, animations, movie clips, music, games, and informational content (e.g., movie show times). While these media applications may support sharing, users may benefit from being empowered to import media into their preferred messaging application and share the media within the flow of a messaging conversation.

Similarly, media applications may benefit from having their media shared within a messaging application configured to provide attribution of the source of shared media. A user receiving an attributed media element may be prompted to install the related media application if they've never used it before, to revisit the related media application if they've previously installed it but haven't used it in a while, or may simply benefit from the convenience of accessing its media through a direct-access control instead of having to launch the media application through a device's standard application launcher. This may provide the media application with greater exposure and increased use.

User engagement with instant messaging conversations may conform to a quick and easy style of communication that benefits from putting exactly the content that a user desires to share at their fingertips with minimal interruption. A user receiving a photo, animation, video, or song in a messaging conversation may desire to respond with their own photo, animation, video, or song with just a few manipulations of a user interface. A user may benefit from quickly moving back-and-forth between their messaging application and the media applications that provide access to the media content they want. A user may further benefit from seeing at least a portion of the media content for media applications within a media discovery area of the messaging application itself. And the developer of the media applications may benefit from making their content easily available thanks to the confidence in knowing that each time their content is shared that they'll receive proper attribution and the promotion of their service to both existing users and potential new ones.

As a result, these techniques can improve the messaging experience for users and promote media applications that actually get used. Exciting new media applications receiving promotion through attribution and getting increased recognition from new users providing even more new content can create a virtuous cycle in which messaging users receive great new media to discover, modify, and share while creative media applications that excite people to use their content benefit from reaching a wider audience.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a media messaging system 100. In one embodiment, the media messaging system 100 may comprise a computer-implemented system having software applications comprising one or more components. Although the media messaging system 100 shown in FIG. 1 has a limited number of elements in a certain topology, it may be appreciated that the media messaging system 100 may include more or less elements in alternate topologies as desired for a given implementation.

A user's access to a media messaging system 100 may be a messaging application 140 installed as a user application on a client device 120 and executing locally on the client device 120. In some cases, the messaging application 140 may include other functionality. For example, the messaging application 140 may be a front-end to a social-networking service, providing messaging services in association with the social-networking service. In many cases, this client device 120 may be a smartphone, cell phone, or other mobile device using a mix of Wi-Fi and cellular data networks to access the Internet and networked resources, though it will be appreciated that any form of network access may be used. For example, one device may tether to another, such as a smart watch tethering to a Internet-capable device (e.g., mobile phone, personal computer) or a mobile phone tethering to a personal computer. The client device 120 may execute a plurality of applications, including the messaging application 140, one or more media applications 130, and other user applications. In other embodiments, however, the client device 120 may comprise a personal computer device, a portable digital assistant, a tablet device, or any other form of computing device. Similarly, in some situations and embodiments, a user may access the media messaging system 100 via a web portal, with the messaging application 140 executing as a web-based application.

The client device 120 may communicate with other devices using wireless transmissions to exchange network traffic. Exchanging network traffic, such as may be included in the exchange of messaging transactions, may comprise transmitting and receiving network traffic via a network interface controller 125 (NIC). A NIC comprises a hardware component connecting a computer device, such as client device 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller 125 may be used for the network activities of the embodiments described herein, including the interoperation of the media applications 130, media servers, messaging application 140, and messaging server 180 through network communication. For example, the messaging application 140 transmitting a message package 170 to a messaging server 180 may be interpreted as using the network interface controller 125 for network access to a communications network for the transmission of the message package 170.

The media applications 130 may comprise applications for one or more of searching media content, discovering media content, sharing media content, storing media content, accessing media content, modifying media content, and combining media content. Each of the media applications may be associated one or more media services, either a dedicated media application for a particular media service or a media application interoperating with a plurality of media services. Each of the media services may provide one or more media servers 135 for storing, retrieving, and generally exchanging media content.

The media servers 135 may distribute media repositories to the local media application 130 comprising bundles of media packages, wherein each of the media packages comprises a media element (a particular instance of media content) and associated information. The associated information for a media element 110 in a media package 105 may include an attribution record 115, the attribution record 115 encapsulating information about the media service, media application, and other sources of the media element 110.

The attribution record 115 may include an inter-application link, the inter-application link identifying the media element 110 within the content space of the related media application and/or media service and thereby serving as a deep link to the media element 110 within the media application and/or media service. The inter-application link may empower a media application or media server to navigate to a particular page, view, or other repository of information for the associated media element 110. The inter-application link may be universal across client devices with regards to a particular media application/media service. The inter-application link may therefore allow a user to share a media element 110 with sufficient contextual information to empower the receiving user to access the media element 110 within its context of its associated media application/media service.

As such, the attribution record 115 may be operative to configure a network component for an application for network access to an associated media element 110 on a media server of the plurality of media servers 135. The attribution record 115 may be operative to so configure the messaging application 140 and one or more of the media applications 130. The attribution record 115 may comprise the inter-application link identifying a particular media element 110 from among the plurality of media elements available on one or more media servers of the plurality of media servers 135. The attribution record 115 may comprise security information empowering a network component to access private, or otherwise non-public, media elements, such as where a media element 110 has been registered to only be shared with authorized users. For example, a user may maintain an online photo album and indicate security settings for the online photo album restricting access to that user and to other users invited to view the album. The attribution record 115 may include a security token, a password, or other security information to allow access to the media element 110—and possibly to other related media elements—on the media service. As such, the messaging application 140 may receive a media package comprising the media service attribution record and configure a network component for the messaging application for network access to the media element 110 on a media server based on the media service attribution record. Where the messaging application 140 shares the media element 110, the messaging application 140 may generate the message package with a media application attribution record operative to configure a network component for the media application for network access to the media element 110 on a media server.

The messaging application 140 may comprise a media management component 160. The media management component 160 may be generally arranged to manage media content within the context of the messaging application 140. The media management component 160 may make media content available to a user of the client device 120 for messaging in the media messaging system 100 and therefore for exchange with other users. The media management component 160 may operate as a crossroads for media from the plurality of media application 130, presenting a unified view on and unified management for a user of the media content of the media applications 130. The media management component 160 may empower the messaging application 140 to interoperate with the plurality of media applications 130, receiving media content from the media application 130, submitting media content to the media applications 130, invoking the viewing of existing media content within the media applications 130, and moving media content from one of the media applications 130 to another.

The messaging application 130 may comprise a messaging component 150. The messaging component 150 may be generally arranged to provide messaging services to a user of the client device 120. Messaging services may comprise the reception of messages, the sending of messages, the maintenance of a history of messages exchanged, and other messaging-related activities. User of the messaging application 140 may be empowered to engage in messaging conversations with a plurality of other users in both private user-to-user conversations, in private group conversations between three or more users, and in public conversations generally open to the messaging community. The messaging component 150 may interoperate with the media management component 160 to enrich any of these messaging conversations with the media content management by the media management component 160.

The media messaging system 100 may include a messaging server 180 from among a plurality of messaging servers. The messaging server 180 may operate as an intermediary between the messaging endpoints of users of the media messaging system 100. The messaging server 180 may track the current network address of a user's active messaging endpoint or endpoints, such as they change network (e.g., a mobile client device 120 moving between Wi-Fi networks, between cellular data networks, and between Wi-Fi and cellular data networks). The messaging server 180 may queue messages for messaging endpoints when they are offline or otherwise not accepting new messages. The messaging server 180 may provide an ordering on messages for a particular user so as to provide consistency in the flow of communication between the potentially multiple messaging endpoints that a user might use. The messaging server 180 may store a messaging history for each user so as to provide access to previously-sent or received messages for a user. The messaging history may include media exchanged between users using the media messaging system 100.

The messaging component 150 may transmit a message package 170 to a messaging server 180 for delivery to one or more other users of the media messaging system 100. The message package 170 may comprise delivery information, such as one or more delivery user identifiers identifying one or more users for the message package 170. The message package 170 may comprise the media package 105 comprising the media element 110 and the attribution record 115. As such, the message package 170 may comprise a rich message incorporating a media element and, potentially, a text message component. It will be appreciated that in some cases text messages may be sent without associated media elements through the messaging server 180. The messaging server 180 may receive the message package 170 and deliver it to a messaging endpoint—such as an installation of the messaging application 140 on a second client device 190—associated with a delivery user account identified by a delivery user identifier for the message package 170.

Where the media element 110 is already stored on the messaging server 180 or on a media server accessible to the media messaging system 100 the media element 110 may not be transmitted from the client device 120. The messaging application 140 may generate or retrieve a hash of the media element 110 and transmit the hash to the messaging server 180 to determine whether the media element 110 is already available in the media messaging system 100. The messaging server 180 may indicate whether the media element 110 is already available and therefore should not be re-uploaded. The messaging server 180 may request an upload of the media element 110 from the client device 120 when the media element 110 is not determined to be available based on the hash. Similarly, where the media element 110 is represented as a uniform resource locator (URL) to a network-accessible source, the uploading of the media element 110 may be avoided. These techniques may serve to reduce the bandwidth used in sharing media elements. By using the unified platform of the media messaging system 110, the bandwidth usage of sharing media elements may be reduced as the media messaging system 110 has visibility into the network locations of network-accessible media elements and may store media elements from a plurality of media application sources using hashing to eliminate duplicate uploads. This reduction of bandwidth usage may increase the speed of media sharing, reduce the usage of a user's bandwidth allocation from a cellular provider, and eliminate the battery usage that may be involved in performing the upload of a media element 110, thereby reducing the overall battery usage for media sharing.

A media element 110 may be managed and manipulated by the media messaging system 100 according to a variety of techniques in various embodiments. In some cases, the media element 110 may be directly stored as computer data representation within the media package 105. For example, an image media element may be stored as a Joint Photographic Expert Group (JPEG) digital image file within the media package 105. In other cases, the media element 110 may be stored as a reference within the media package 105, the reference comprising a resource locator—such as a URL—providing a network-accessible address for the media element 110. As such, while the media management component 160 may cache an instance of the media element 110 on the client device 120 for local access, the media element 110 may be shared using the resource locator so as to avoid the client device 120 uploading the media element 110 during transmission to the second client device 190. Instead, the messaging application 140 on the second client device 190 may receive the media element 110 as the resource locator and fetch an instance of the media element 110 after reception resource locator. This eliminates the use of upload bandwidth for the client device 120 without potentially leverage the storage and bandwidth of the media servers 135 for the second client device 190 to download the media element 110. Alternatively, the messaging server 180 may cache or retrieve the media element 110 and include it with the message package 170 when delivering the message package 170 to the second client device 190. It will be appreciated that, in general, any known technique for formatting and storing media content may be used. In some cases, the media messaging system 100 may re-size, re-code, change the format, or change the quality level of a media element 110 prior to uploading or prior to transmission to a destination second client device 190. This may be performed to reduce the storage space used in storing a media element 110 or the bandwidth used in uploading or downloading the media element 110.

The media messaging system 100 may use knowledge generated from interactions in between users. The media messaging system 100 may comprise a component of a social-networking service and may use knowledge generated from the broader interactions of the social-networking service. As such, to protect the privacy of the users of the media messaging system 100 and the larger social-networking service, media messaging system 100 may include an authorization server (or other suitable component(s)) that allows users to opt in to or opt out of having their actions logged by the media messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the media messaging system 100 and other elements of a social-networking service through blocking, data hashing, anonymization, or other suitable techniques as appropriate. For example, while interactions between users of a social-networking service and the social-networking service may be used to learn media content preferences and the relationship between preferences for different pieces of media content, these interactions may be anonymized prior to or as part of the learning process.

Figure 2A:
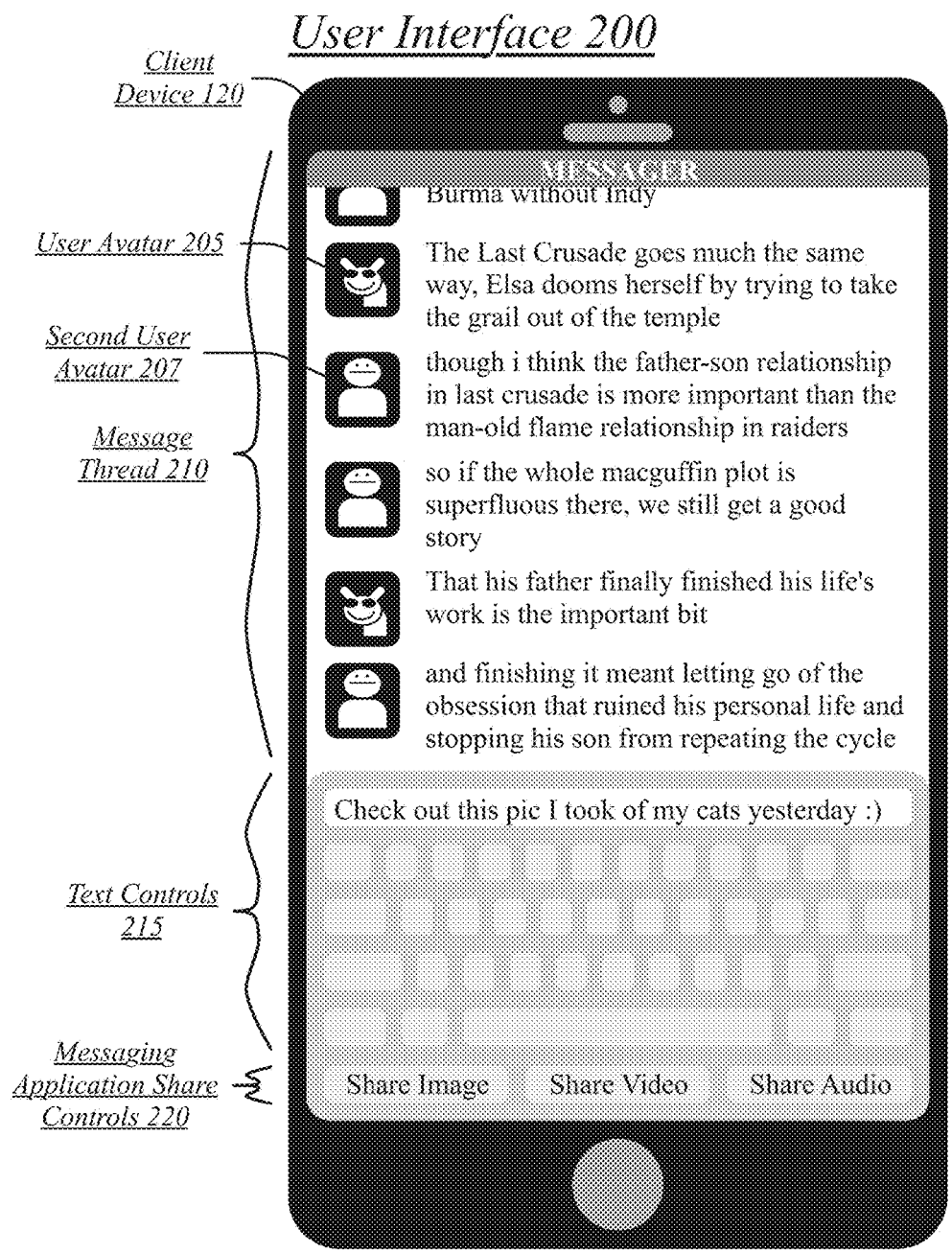
FIG. 2A illustrates an embodiment of a user interface for a messaging application with share controls.

FIG. 2A illustrates an embodiment of a user interface for a messaging application 140 with messaging application share controls 220.

A control for sharing or media element viewing within either the messaging application 140 or a media application may correspond to a "call to action" button by virtue of the control promoting the action of using the corresponding application. For example, a control to install an application may comprise an "install call to action," a control to launch an application may comprise a "launch call to action," etc.

In the illustrated embodiment of FIG. 2A, the messaging application 140 is displaying a message thread 210. The illustrated message thread 210 corresponds to a private messaging conversation between two users. A first user, the user of the client device 120, is visually represented in the message thread 210 by a user avatar 205 associated with their user account for the media messaging system 100. A second user, the user of the second client device 190, is visually represented in the message thread 210 by a second user avatar 207 associated with their respective user account for the media messaging system 100.

The user of client device 120 and the messaging application 140 may use text controls 215 to enter textual elements of the message thread 210, such as text messages for transmission to the second user on the second client device 190. It will be appreciated that while the text controls 215 and other controls of the messaging application 140 are depicted as touch-controls on a touch screen that other controls, including a hardware keyboard and hardware pointer control, may be used with other embodiments.

The user interface 200 includes messaging application share controls 220. In the illustrated embodiment, the messaging application share controls 220 comprise an image-sharing control, a video-sharing control, and an audio-sharing control. It will be appreciated that additional and alternative sharing controls may be included in various embodiments. For example, while in the illustrated embodiment the sharing controls are divided amongst content type (i.e., image, animated image, video, and audio) that in other embodiments different divisions may be used or that no division may be used. In some cases, a universal share control may be provided to users providing access to all types of media content. In some cases, sharing controls may be provided for specific forms of content, such as stickers, songs, smilies, emoji, GIFs, and other categories of media content other than an image/video/audio division.

The user of the messaging application 140 may select one of the messaging application share controls 220 to initiate the selection of media content for sharing in the message thread 210 with the second user. In some embodiments, the messaging application share controls 220 may be displayed without the adjacent text controls 215. In some embodiments, a variety of controls may be displayed along the bottom of the user interface 200 for the messaging application 140, with one of the variety of controls invoking the text controls 215 and others one or more of various varieties of sharing controls dedicated to different types of media content.

Figure 2B:
FIG. 2B illustrates an embodiment of a user interface for a messaging application displaying available media elements.

FIG. 2B illustrates an embodiment of a user interface 225 for a messaging application 140 displaying available media elements.

In the illustrated embodiment of FIG. 2B, the user interface 225 is displaying media element display section 235. The media element display section 235 displays media content comprising a plurality of media elements. In this example, the plurality of media elements each comprise a photo. However, in other cases the media elements may each comprise a video (e.g., film clip, movie), audio segment (e.g., song, voice recording), animated image (e.g., an animated Graphics Interchange Format (GIF) image), any other type of media element, or any combination of different types of media elements. The media element display section 235 may be operative to be manipulated via user interface commands to display additional contents, such as by a scrolling command.

In the illustrated embodiment, the media element display section 235 is displaying a collection of photos associated with a particular media application "JPEGGY," an example image hosting and sharing service. The media content displayed in the media element display section 235 may comprise a preview of a subset of photos stored online with a particular media application. The media messaging system 100 may have identified that this particular media application of a plurality of media applications 130 is a favorite media application for the user and therefore given this media application a position of prominence. Alternatively, the user may have selected this media application in a prior step of media selection.

Other categories of media content may be made available to the user of the messaging application 140. For example, as illustrated, the user may be able to select a "popular media" section by selecting a "popular" tab for the media element display section 235. A popular section may be populated with popular, trending, or otherwise noteworthy media elements as determined by the media messaging system 100 or a particular media application.

In another example, as illustrated, the user may be able to select a "history" section by selecting a "history" tab for the media element display section 235. A history section may be populated with every media element shared by a particular user. A history section may be populated with every media element shared within a particular conversation, such as the message thread 210, by either user so as to allow either user (or any user in a group conversation) to reference the media history for their shared conversation.

In another example, the user may be able to select a "recommended" section by selecting a "recommended" tab for the media element display section 235. A recommended section may be populated with media elements recommended to the user by the media messaging system 100. Media may be recommended based on indiscriminate promotion to all users of the media messaging system 100, may be recommended based on specific promotion to this user, and may be recommended based on specific promotion based on the particular message thread 210, including being based on either or both on the other user(s) contributing to the message thread 210 and analysis of the content of the message thread 210.

In general, a variety of criteria may be used individually or in combination to determine the media elements displayed in a media element display section 235. Media content of predicted interest to a user may be promoted based on explicit and implicit signals. Explicit signals may comprise explicitly-entered information about a user, such as the explicit registration of age/birth date, gender, location of residence, schooling, likes and dislikes, and any other explicit indication of direct interest or association with a category that may suggest a correlation between the interests of different users. Implicit signals may comprise implicitly-determined information about a user, such as information gathered from messaging conversations, automatic geolocation, uploaded photographs, shared media, or other uses of the media messaging system 100 or a social-networking service that are not primarily oriented towards the registration of information but instead oriented towards the use of the system or service while still providing data that may correlate to particular likes or dislikes.

Further, the particular context of the message thread 210 may be used. For example, the media messaging system 100 may provide event-related media elements in response to a conversation identified as pertaining to an event, such as a sporting match, news event, or other type of happening. The media messaging system 100 may provide topic-related media elements in response to a conversation identified as pertaining to a topic, such as a sports, movies, food, or other conversational topics. The media messaging system 100 may provide personally-relevant media elements in response to a conversation addressing or being between particular people, such as promoting recently-uploading photos of a couple in a message thread 210 between the participants in a couple. The media messaging system 100 may particularly promote media elements related to a media element recently shared by an other party in a message thread 210, such as by finding media elements on a similar topic, of a similar subject, or otherwise with a relationship to a recently-shared media element.

The user may be empowered to select a particular media elements from the plurality of media elements displayed in the media element display section 235 and to have that selected media element included in the message thread 210.

Figure 3A:
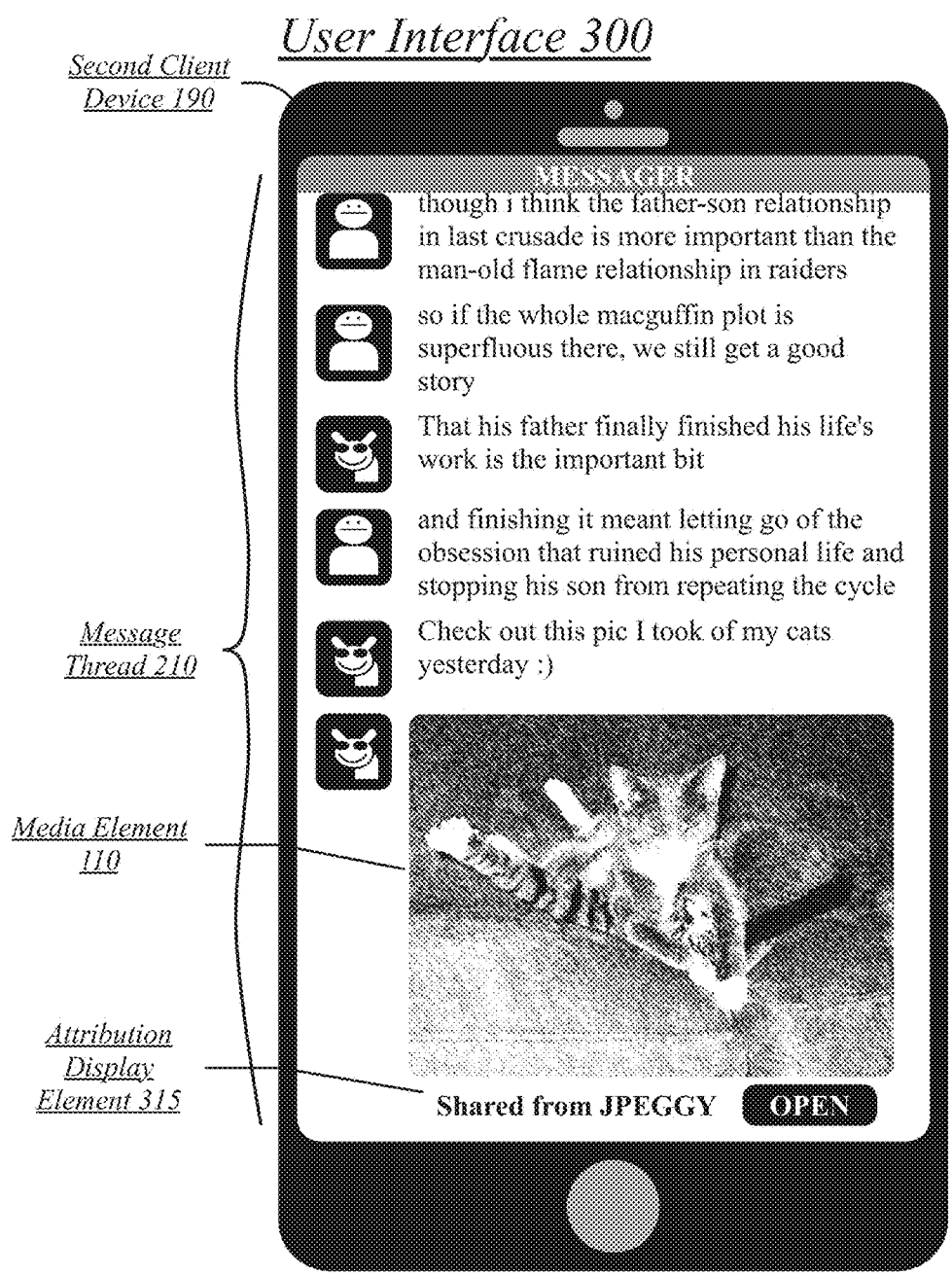
FIG. 3A illustrates an embodiment of a user interface for the messaging application displaying an attributed media element in a message thread.

FIG. 3A illustrates an embodiment of a user interface 300 for the messaging application 140 displaying an attributed media element in a message thread 210. In contrast to the illustrated embodiments of FIG. 2A and FIG. 2B, the user interface 300 is illustrating the display for the second client device 190 belonging to the second user in the message thread 210.

In the illustrated embodiment of FIG. 3A, the first user has elected to share a media element 110 corresponding to a personal photo of two cats stored in an image-sharing service JPEGGY and this image has been incorporated into the flow of the message thread 210. While in the illustrated embodiment of FIG. 3A the comment from the first user "Check out this pic I took of my cats yesterday :)" is entered as a distinct line in the messaging conversation, it will be appreciated that in other embodiments such a comment may be optionally included as a caption for the photo as such functionality may be provided by the messaging application 140.

As shown in user interface 300, the media element 110 is displayed in association with an attribution display element 315. The attribution display element 315 visually communicates the particular media application from which the media element 110 was shared. The attribution display element 315 further comprises a control—here depicted as an "OPEN" button—for accessing the media element 110 within the attributed media application with which the media element 110 is associated. An identifier for this media application, a description of how to compose the attribution display element 315, and a inter-application link corresponding to the media element 110 may all comprise portions of an attribution record 115. This attribution record 115 may comprise an element of the media package 105 for the media element 110.

The control may include an option to install the attributed media application, such as may be described by a "INSTALL" or "GET" label. A control may include an option to update an already-installed attributed media application, such as may be described by an "UPDATE" label. Updating an already-installed media application may be suggested where the updated version of the attributed media application supports deep linking and/or messaging thread linking as a new feature over an already-installed version of the media application. Installation and updating may be performed using a variety of techniques. In one technique a fast-app switch may be performed using a deep link into an application store. In another technique a fast-app switch with return may be used, in which a deep link into the application store is used with an automatic return to the messaging application 140 and the specific messaging thread within the messaging application 140 responsible for the launching of the application store. In another technique an in-app install may used, in which the user selects an install button with the messaging application 140 and the media application is installed without leaving the messaging application 140. Where the media application is installed without leaving the messaging application 140 the user may be shown an indication that the media application is in the process of being installed (e.g., an installation progress graphic) and that the media application has been successfully installed, such as through a fly over graphic indicating media application installation. An installation control may transition to a launch control once the media application is installed.

Each view of an attributed media element may be recorded in an attributed media viewing record. In some cases, an attributed media viewing record may be used to drive commerce between the provider of the media messaging system 100 and the media application providers. For example, the media messaging system 100 may receive a fee for each attributed media element viewed. In another example, the media messaging system 100 may receive a fee for each user that has viewed one or more media elements attributed to the media application. Any sort of commercial arrangement may be arranged on the basis of attributed media elements being shown, attributed media elements being shared, attributed media elements being offered for sharing within the messaging application 140, for installations of media applications, for launching of media application from within the messaging application 140, or any other interaction between the messaging application 140, media applications, and media content related to media applications.

The user interface 300 may comprise a case in which the associated media application—here the JPEGGY image sharing application—is already installed on the second client device 190. The messaging application 140 may therefore be able to directly execute the media application for use by the user. However, in many cases the first user may share a media element 110 associated with a media application not currently installed by the second user. This may be a beneficial event in that it may expose the second user to a new media application in which they may be interested via an implicit recommended through the first user's sharing action. In these cases, the attribution display element 315 may include still include a control for accessing the media application. However, this control may initiate the installation of the media application by providing the user with an option to install the media application from which the media element 110 was shared. In these cases instead of the "OPEN" control a "TRY IT" control may be used offering the user the opportunity to install the new media application and try it for themselves. The option to install the media application may be provided by, for example, loading an application repository (e.g., an "app store") and directing the application repository utility to display an application installation interface empowering the user to install the media application, such as by selecting an installation control on an application page for the media application.

The attribution display element 315 may be customized to each particular media application, such as through the inclusion of custom text, a custom logo, a custom image, a custom icon, or any other custom display element. A custom display element may identify the media application responsible for the media element 110, such as through an icon specific to the media application. A custom display element may include an application-specific invitation to use the media application, such as an audio mixing application inviting the user to "TrackSmash" an audio track onto an animated image. This may include the customization of a control for accessing the media application (either opening an already-installed application or initiating the installation of a not-currently-installed application). In some embodiments, selecting the shared media element 110 itself may result in the associated media application being launched and directed to its internal page corresponding to the media element 110.

Figure 3B:
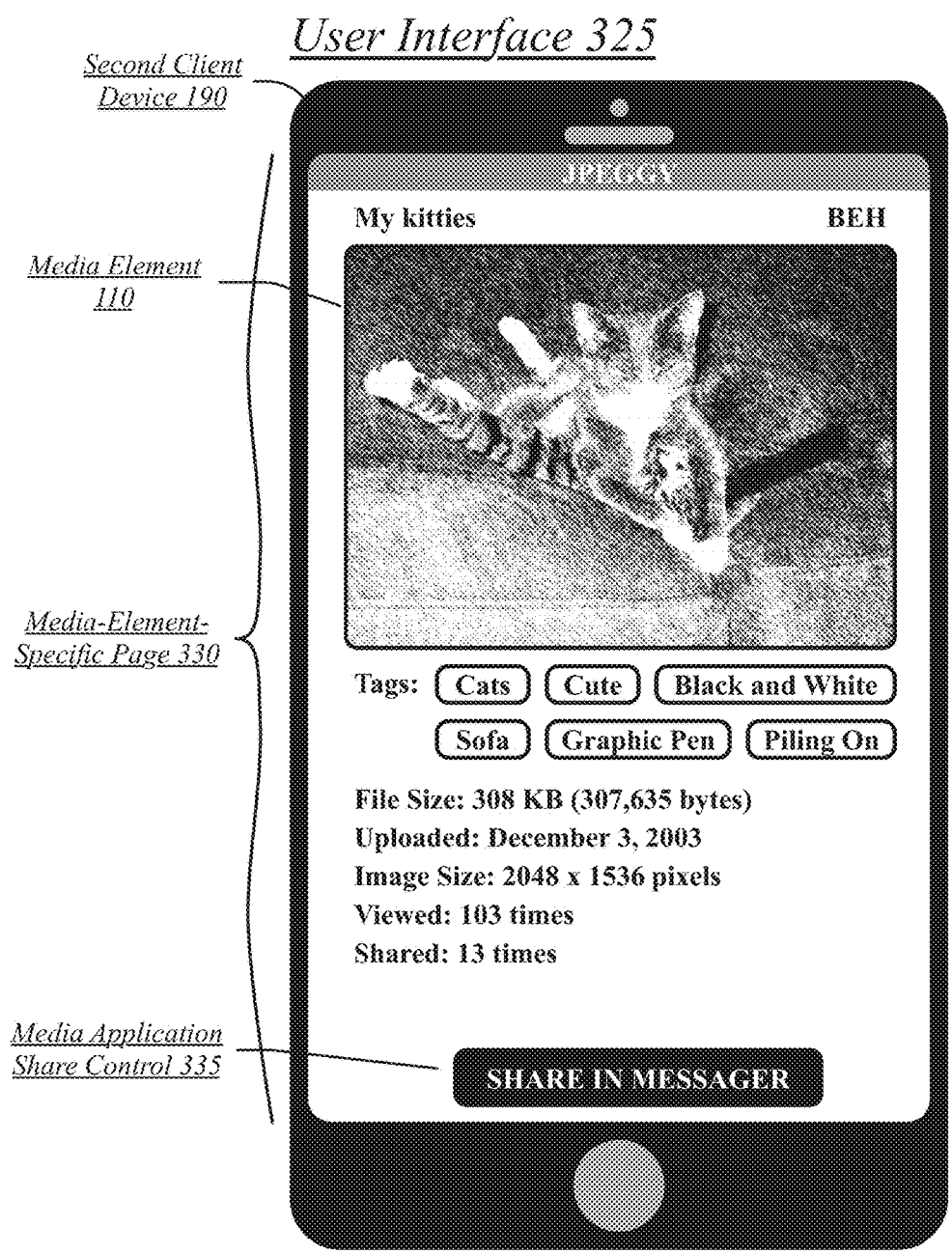
FIG. 3B illustrates an embodiment of a user interface for a media application displaying a page for a deep-linked media element.

FIG. 3B illustrates an embodiment of a user interface 325 for a media application displaying a page for a deep-linked media element 110.

In the illustrated embodiment of FIG. 3B, a media application interface displays a media-element-specific page 330 specific to the media element 110 received by the user of the second client device 190 from the user of the client device 120. To reach the media-element-specific page 330 the user of the second client device 190 may have selected the control for accessing the media element 110 in the media application displayed as part of an attribution display element 315.

The illustrated media-element-specific page 330 includes a display of the media element 110, a title for the media element 110 "My kitties," a user account within the media application associated with the media element 110 or this particular sharing of the media element 110 "BEH," a plurality of tags assigned to the media element 110 within the media application, and a variety of information about the media element 110 including file size, date uploaded, image size, number of times viewed, and number of times shared. The media-element-specific page may correspond to any page or application view specifically related to a particular media element 110. While in the illustrated embodiment the media element 110 is the only media element displayed on the page, in alternate embodiments additional media elements may be displayed such as similar media elements, related media elements, etc. Similar, additionally controls, such as for remixing, applying filters, and other modifications may be included in the media-element-specific page 330.

An media-element-specific page 330 may include a media application share control 335 empowering a user of the media application to share the media element 110 featured on the media-element-specific page 330. The illustrated example media application share control 335 is a messaging-application-specific media application share control specifically associated with a particular messaging application 140. Selecting the media application share control 335 may therefore directly launch (e.g., bring to the foreground) the messaging application 140 and transfer the media element 110 to the messaging application 110 with the proper attribution record 115 for this media element 110. This media-element-specific page 330 may therefore correspond to a similar or identical view to that used by the user of the client device 120 when they initially selected the media element 110 for inclusion in the message thread 210.

In other embodiments, a general media application share control—a non-application-specific media application share control—may be used in the media application. Selecting this general media application share control may initiate an interface offering multiple ways to share the media element 110, such as email, the Multimedia Message Service (MMS) extension of the Short Message Service (SMS) system, messaging applications including the messaging application 140 associated with the media messaging system 100, and other methods of media sharing.

In some cases, a media application showing a messaging-application-specific media application share control specifically associated with a particular messaging application 140 may correspond to a messaging-application specific version of the media application. For example, the JPEGGY media application may release a version of the JPEGGY media application specifically designed for integration with the messaging application 140 for the media sharing system 100. While the messaging application 140 may be operative to accept media content from both messaging-application-specific media applications and non-messaging-application-specific media applications, messaging-application-specific media applications may be preferred by the messaging application.

As such, where a user has both the messaging-application-specific version and the non-messaging-application-specific version of a media application installed, the messaging application 140 may select to launch the messaging-application-specific version of the media application in response to a user request to view a media element 110 within the media application. In other embodiments, an attribution record 115 may indicate the application version used and the messaging application 140 may launch the indicated version. Similarly, where no version of a media application is currently installed on a client device, the messaging application 140 may select the messaging-application-specific version of the media application in response to a user request to install the application where displayed as part of an attribution display element 315.

In some embodiments, a messaging-application-specific version of the media application may be promoted—such as through a banner, interstitial, pop-up, or other user interface element—where a non-messaging-application-specific version of the media application is detected on a client device or used in conjunction with the messaging application 140. For example, when receiving a media element 110 from a non-messaging-application-specific version of a media application, the messaging application 140 may inform the user of the client device of the availability of the messaging-application-specific version of the media application and offer to initiate installation of it for the user. This may benefit the user by providing them access to a version of the media application that allows one-control access to the messaging application 140 without going through a general share control and finding the messaging application 140 in a generalized sharing interface.

Figure 3C:
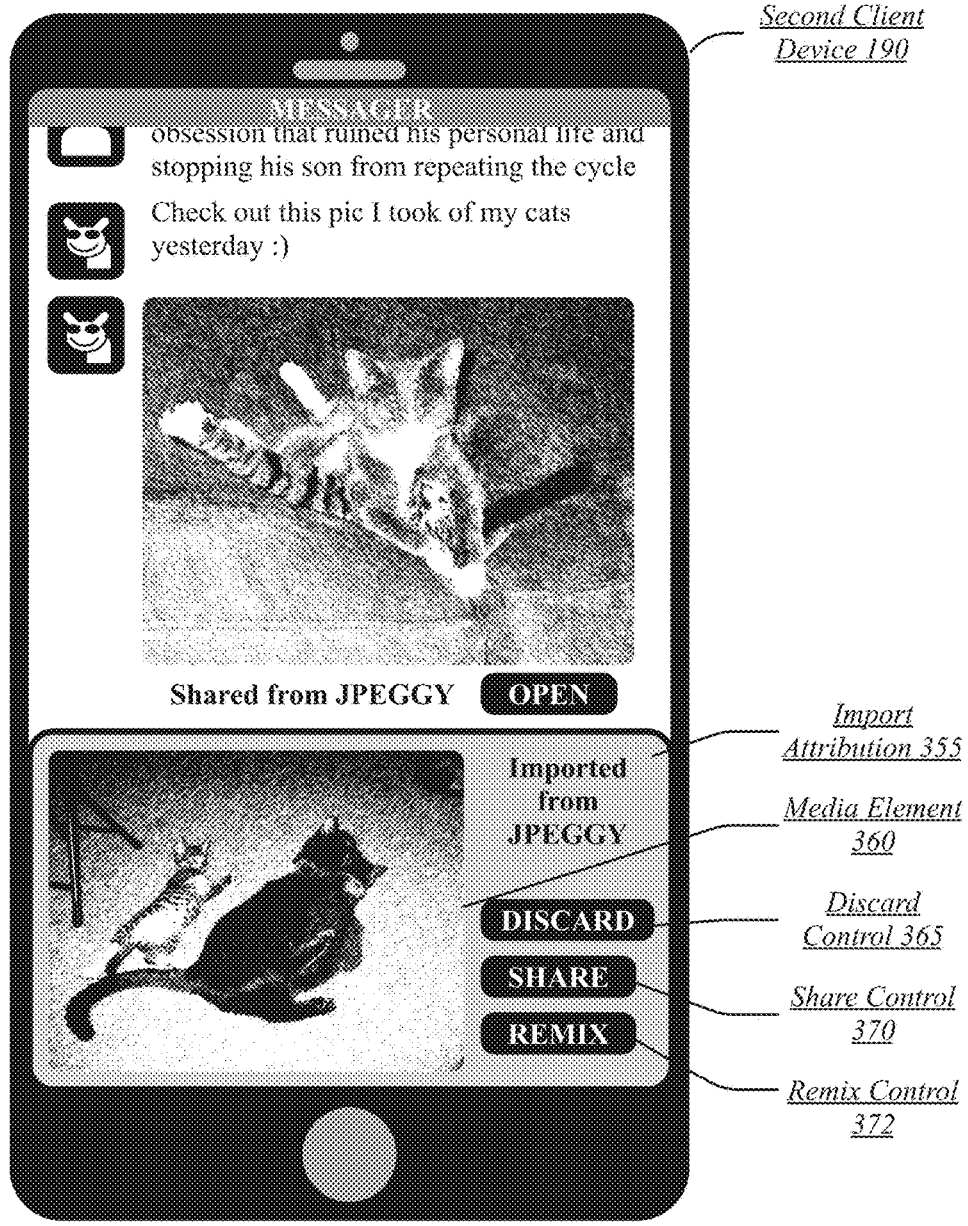
FIG. 3C illustrates an embodiment of a user interface for the messaging application displaying a share control for approving the sharing of an imported second media element.

FIG. 3C illustrates an embodiment of a user interface 350 for the messaging application 140 displaying a share control 370 for approving the sharing of an imported second media element 360.

The media element 360 may correspond to a media element discovered by the user of the second client device 190 in the media application. In this example, the second media element 360 may have been discovered through a search of other images associated with the user sending the first media element 110 as both images are personal photos of a shared subject taken by the first user. However, in other cases images may be found through a variety of techniques, including exploring images with similar tags, exploring images with a particular tag, keyword search, natural language searches, or any other technique for searching, exploring, and discovery media content.

The messaging application 140 may be generally arranged to confirm with a user of the messaging application 140 that they wish to share imported media content before transmitting it for inclusion in a message thread 210. This may both serve to prevent the malicious inclusion of media elements received by misbehaving media applications sending media elements for inclusion without user prompting and to allow the user to confirm that they selected the correct media element, to view the media element as it would appear in the message thread 210, and otherwise confirm their decision.

As such, the messaging application 140 may display a share control 370 in association with a received media element 360. The share control 370 may empower the user of the messaging application 140 to include the received media element 360 in the message thread 210. Selecting the share control 370 may prompt the messaging application 140 to transmit a message package including the media element 360 to the messaging server 180 for delivery to the first user's messaging application 140 on the first client device 120.

The media element 360 may have been discovered in the media application through the media application being invoked by the messaging application 140. As part of invoking the media application, the messaging application 140 may pass the media application an message-thread-specific inter-application link for the message thread 210 with the messaging application 140. A message-thread-specific application link may server the converse purpose of a media-element-specific inter-application link: the former may identify a specific message thread 210 prompting the search for media content to share, while the latter may identify the specific media element 110 prompting this same search. Where the media-element-specific inter-application link may be used by the messaging application 140 to direct the media application to a media-element-specific page to serve as the starting point for discovering and/or modifying media content, the message-thread specific inter-application link may by used by the media application to direct the messaging application 140 to prompt a user of the messaging application 140 to include a received media element within a particular message thread 210. This may serve to simplify the transition between the messaging application 140 and the media application by placing a user within the relevant context within each for the transition between the applications.

As such, the message-thread-specific application link may be generated by the messaging application 140 and included as part of invoking a media application. The message-thread-specific application link may be received by the messaging application 140 as part of a media package and used by the messaging application to determine the particular message thread 210 to offer to the user to enrich with a received media element. It will be appreciated that the user may also be offered the opportunity to direct a received media element to a different message thread, such as through a control to select a different message thread.

A user interface 350 for a received media element 360 may include a discard control 365. The discard control 365 may be used by the user to refrain from including the received media element 360 in any message thread. The discard control 365 may empower the user to discard media elements received malicious or unintentionally.

A user interface 350 for a received media element 360 may include an import attribution 355. The important attribution 355 may remind the user both of the media application responsible for exporting the media element 360 and remind the user that an attribution display element will accompany any inclusion of the media element 360. In some embodiments, the import attribution 355 may be selected by a user to return the user to the media application, such as to select a different piece of media content.

A user interface 350 for a received media element 360 may include a remix control 372. The remix control 372 may allow the user to access options to remix, modify, combine, and otherwise alter an imported media element 360. A remix control 372 may provide similar access to options to remix, modify, combine, and otherwise alter media elements shared within a message thread 210 by another user. The remix control 372 may provide access to both functions to alter the media element 360 that execute within the messaging application 140 and to external applications on the client device that empower a user to alter media content, such as through layering an audio track (e.g., music track) on an image or video.

Figure 3D:
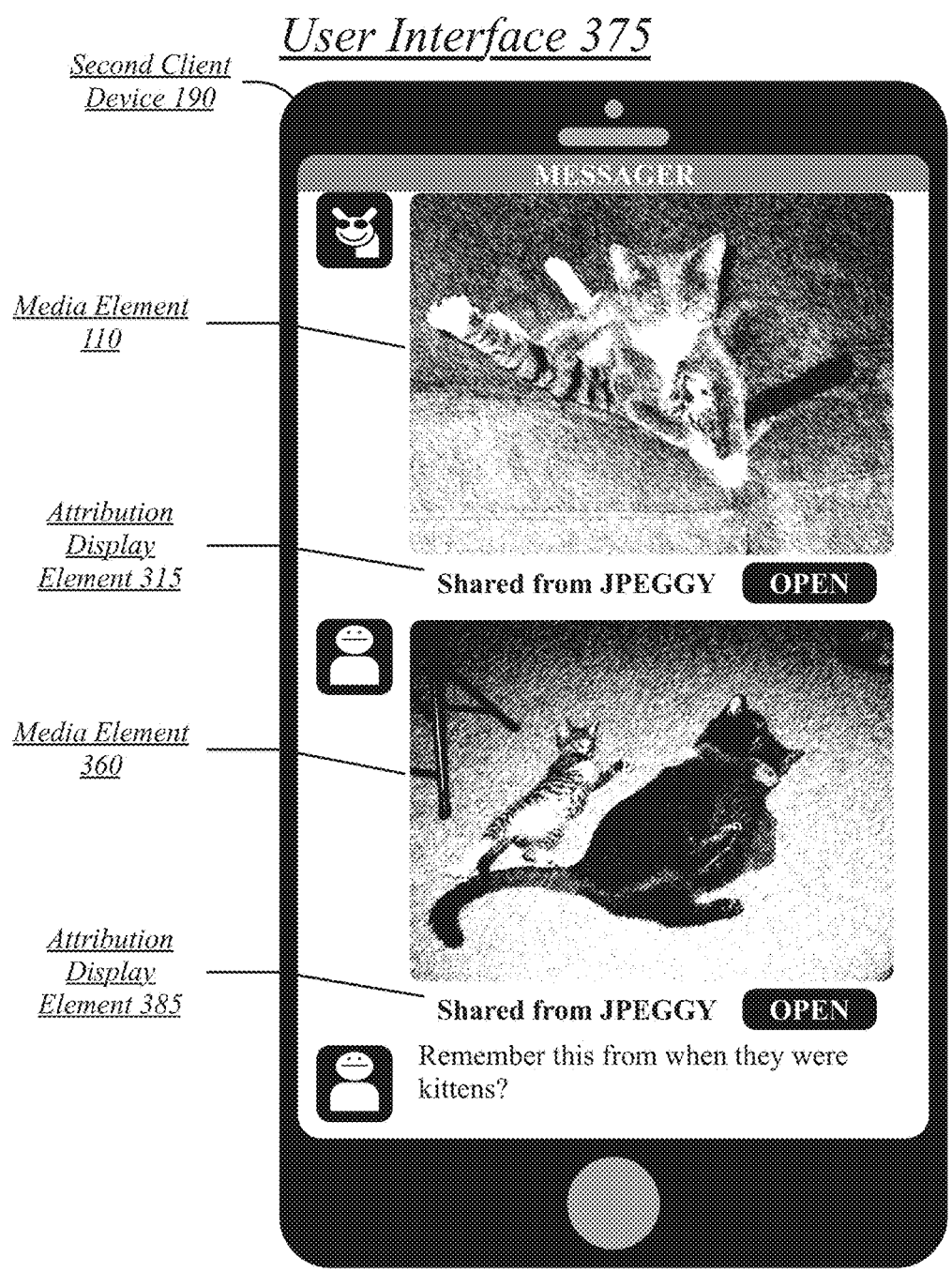
FIG. 3D illustrates an embodiment of a user interface for the messaging application displaying the approved sharing of the imported second media element.

FIG. 3D illustrates an embodiment of a user interface 375 for the messaging application 140 displaying the approved sharing of the imported second media element 360.

The user interface 375 for FIG. 3D illustrates the case in which the user of the second client device 190 selected the share control 370 approving the inclusion of the media element 360 within the message thread 210. As shown in user interface 375, the second media element 360 is also displayed with an attribution display element 385, similar to the attribution display element 315 used with the first media element 110. This second attribution display element 385 may similarly be used to access the second media element 360 in the media application, further the inclusion of media content within the message thread 210 and the back-and-forth sharing of media content between the participants in the message thread 210.

Figure 4:
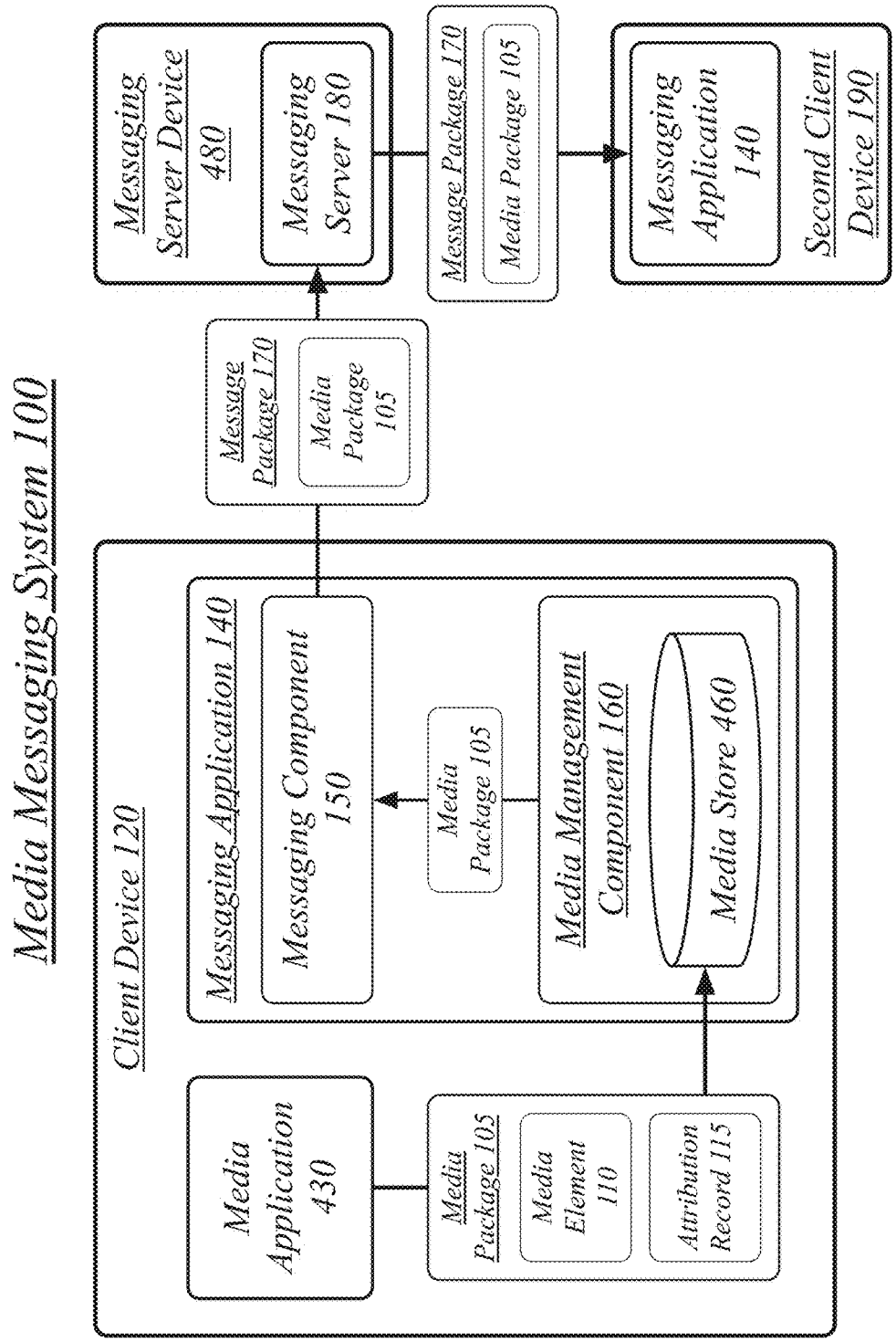
FIG. 4 illustrates an embodiment of the messaging application sharing a media element received from a media application executing on the same client device through a messaging server.

FIG. 4 illustrates an embodiment of the messaging application 140 sharing a media element 110 received from a media application 430 executing on the same client device 120 through a messaging server 180.

The media management component 160 may receive a media element 110, the media element 110 associated with a media application 430. The media management component 160 may store the media element 110, and may include an entire media package 105 including the media element 110, in a media store 460 on the client device 120. The media store 460 may cache media content for use with the messaging application 140.

Both the messaging application 140 and the media application 430 may be installed on the client device 120 as distinct user applications. The media management component 160 may receive a media package 105 in the messaging application 140 from the media application 430 via inter-application communication on the client device 120, with this media package comprising the media element 110 and the inter-application link.

The sharing of the media package 105 may have been prompted by user activity in the media application 430. The media application 430 may receive a user media selection of the media element 110 in the media application, receive a user media sharing command in the media application, and transmit the media package 105 from the media application 430 to the messaging application 140 in response to the user media selection and user media sharing command.

In some cases, the media element 110 may have been discovered by the user in a media element discovery section of the messaging application 140. A media element discovery section may be used for display media content that is predicted to be of interest to a user of the messaging application 140, such as may be based on information known about the user, including messaging context, relationship context with other participants in a message thread 210, explicit and implicit signals registered with a social-networking service, and any other information known about the user. The media management component 160 may display the media element 110 in the media element discovery section of the messaging application 140; receive a user media selection of the media element 110 in the media element discovery section; and prompt the messaging component 150 to generate the message package 170 comprising the media element 110 in response to the user media selection of the media element 110. The media element discovery section may include both applications and media elements. Applications may include applications already installed on the device and suggested applications not already installed on the device. Applications may be ranked in their presentation, including ranking based on the promotion of specific applications. Media elements may include media elements from media applications already installed on the device and media elements from suggested applications not already installed on the device.

Media elements may be ranked in their presentation, including ranking based on the promotion of specific applications. Media applications and their associated media elements may be ranked according to a quality of the media application (e.g., according to user rankings), virality of the media application (i.e., its tendency to spread to new users to which it is exposed), location of the user (which may be used in combination with other metrics such that, for example, quality and virality are judged without the local of the user), a personalized user model of which media application the user likes to use and what content the user likes send (such as may be determined using machine learning), or according to any other technique. These techniques may be used to determine which media applications show up in a media application discovery section, which media elements are shown in a composer, and the order of media applications and media elements in either. Media applications may be promoted based on similarity to media applications already in use by the user. Media applications may be promoted based on being used by other users with similar characteristics (e.g., demographic information) to the user. Media applications may be selected for promotion by maintainers of the media messaging system 100 due to those media applications driving traffic on the messaging platform.

Media applications may be promoted when they provide a higher degree of integration with the media messaging system 100. A low degree of integration may correspond to a media application that merely enables sharing within Messenger with content attribution. A high degree of integration may correspond to the application providing calls to action (e.g., screen controls) to reply using the messaging application 140, to install the messaging application 140, or to otherwise actively promote the user of the messaging application 140. Media applications provided a high degree of integration may be promoted for use to the users in a media application discovery section of the messaging application 140 on the basis of providing the best experience of integration with the media messaging system 100. Such media applications may be promoted whether or not the media applications are already installed, thereby promoting both the discovery of new media applications and the use of existing media applications.

In some cases, the media element 110 may have been previously shared within the message thread 210 by one of the participants in the message thread 210. The messaging application 140 may empower participants in the message thread 210 to reference their shared history of media sharing. The media management component 160 may display the media element 110 in a previously-exchanged media element section of the messaging application 140; receive a user media selection of the media element 110; and prompt the messaging component 150 to generate the message package 170 comprising the media element 110 in response to the user media selection of the media element 110. A previously-exchange media element section may also be used to find a media element 110 for remixing prior to transmission, such as to show off the remixing capabilities of a new media application using media content with which both of the participants would be familiar.

In some cases, the media application 430 may be promoted within the messaging application 140. A media application 430 may be promoted based on a commercial consideration between the provider of the media application 430 and the provider of the messaging application 140, based on a mutual-promotion agreement between the provider of the media application 430 and the provider of the messaging application 140, based on predicted interest of a user in the media application 430, based on targeting of the user by the media messaging system 100 for promotion of the media application 430 based on targeting criteria provided by the provider of the media application 430, or any combination of these. The media management component 160 may display the media element 110 in an application-specific media element section of the messaging application 140, the application-specific media element section associated with the media application 430; receive a user media selection of the media element 110 in the application-specific media element; and generate the message package 170 comprising the media element 110 in response to the user media selection of the media element 110.

Media applications may be promoted to promote the health of the media application ecosystem, balancing the promotion of high-quality media applications and the promotion of diversity of media applications being used. A particular media application may be explicitly marked as high-quality by maintainers of the media messaging system 100 or automatically marked as high-quality by the automated analysis of the behavior or explicit ratings by users of the media application. Diversity may be promoted by encouraging the wider user base or particular users to try new applications, different applications, applications providing new or different media types, or to promote any category of media or application under-represented within the ecosystem of the media messaging system 100. Users of the media messaging system 100 that engage in above-average, of a particular percentile rank, or by another metric are high-frequency media sharers may be analyzed to determine particular media applications, particular types of media applications, part types of media, or other indicators of high-usage and those media applications or types of media may be promoted to other users to encourage a higher frequency of use. Such analysis may be performed automatically by the media messaging system 100 using machine learning techniques.

To avoid unwanted media content sharing, the messaging application 140 may prompt a user to approve the sharing of any media content received from an external media application or media service. The media management component 160 may extract the media element 110 from the received media package 105 and display a preview of the media element 110 in the messaging application 140. The media management component 160 may receive a user media selection of the media element in the messaging application and prompt the messaging component 150 to generate the message package 170 comprising the media element 110 in response to the user media selection of the media element 110 within the messaging application 140.

The messaging component 150 may generate a message package 170, the message package 170 comprising the media element 110. The message package 170 may comprise an attribution record 115 for the media element 110, the attribution record 115 comprising an inter-application link for the media element 110 with the media application 430. The media element 110 and attribution record 115 may be bundled together in a media package 105 by the media application 430 and received as components of the media package 105.

The message package 170 may comprise a metadata block containing context information for the sharing of the media element 110. The message package 170 may contain information on the participants in the messaging conversation, topics of the messaging conversation, metadata about any media sharing to which the media element 110 is a reply, interaction frequency data (e.g., how often the messaging participants interact), topic frequency data (e.g., how frequently the messaging participants discuss the current topic of conversation to which the shared media element 110 may relate), topic popularity data (e.g., popularity of the current topic of conversation or topic of the media element 110 within the media messaging system 100 or media application 430), user preferences, any other information relevant to crafting appropriate, contextual, or customized replies.

The messaging component 150 may transmit the message package 170 to a messaging server 180. The message server 180 may execute on a messaging server device 480. The messaging server device 480 may comprise a sole server device one of a plurality of server devices used by a media messaging system 100. The message package 170 may comprise address information identifying a user account for a recipient of the message package 170.

Figure 5:
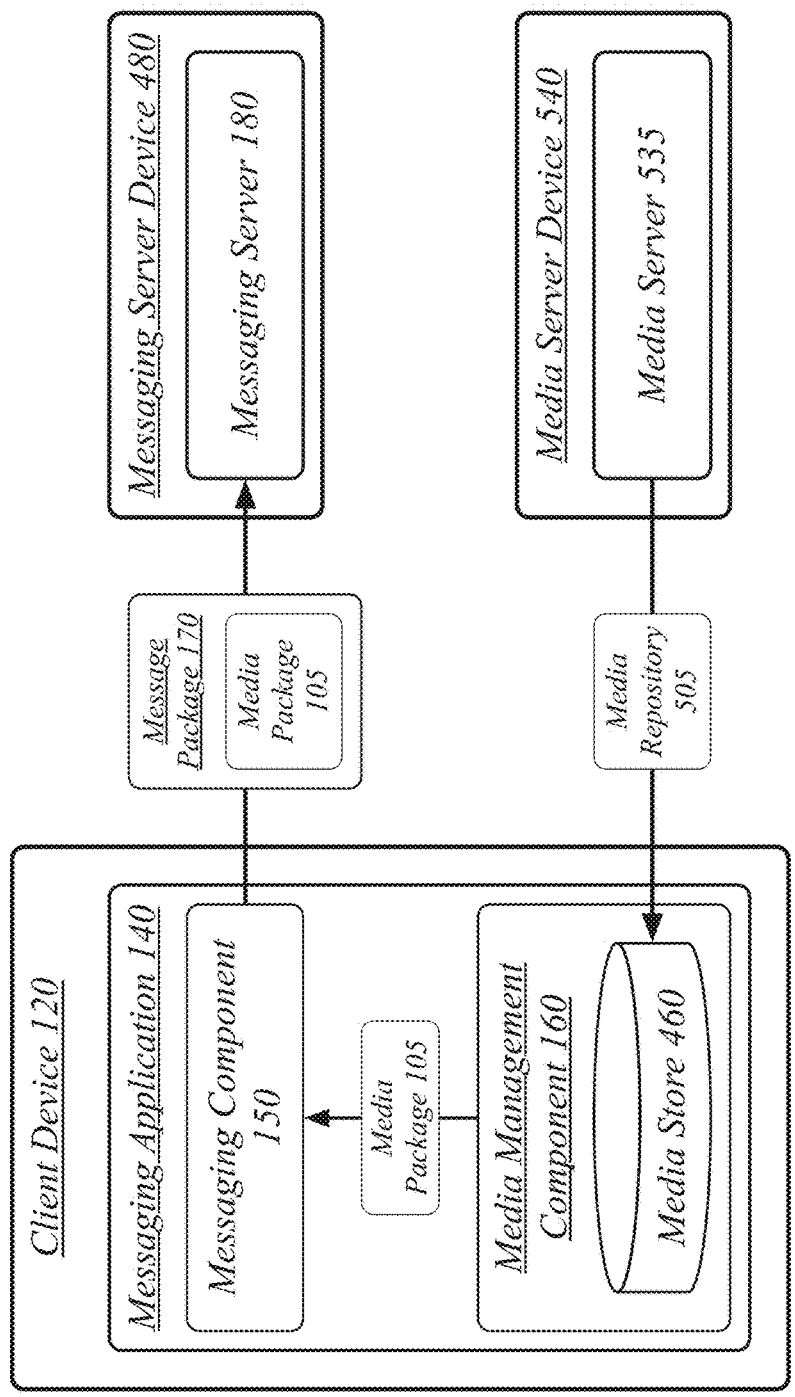
FIG. 5 illustrates an embodiment of the messaging application receiving a media package from a media server associated with the media application.

FIG. 5 illustrates an embodiment of the messaging application receiving a media package from a media server associated with the media application.

In some embodiments, while the media element 110 may be associated with a media application 430, the media element 110 may be received from a media server 535 rather than from the media application 430 on the client device 120. The media element 110 may still be received with an inter-application link—or a plurality of inter-application links where a plurality of media elements are received—for access to the media element 110 within the media application 430. This may be beneficial where a plurality of media elements are to be promoted within the messaging application 140.

In some cases, a media repository 505 may be received from a media server 535 maintained by the provider of the messaging service represented by the messaging server 180 and/or messaging application 140. For example, a media sharing service may provide the messaging service with media content for promotion on the messaging service to prompt users to use the media sharing service and its associated media application. This media content may be displayed within a media-selection interface within the messaging application 140 with attribution to the media sharing service. This media content may therefore be shared through the media messaging system 100, with senders and recipients of this media content being shown attribution display elements for the media content promoting the use of the media sharing service and the media content of the media sharing service.

The media management component 160 may receive a media repository 505 from a media server, the media repository 505 comprising a plurality of media elements, the media element 110 comprising one of the plurality of media elements. The media management component 160 may store the plurality of media elements in a media store 460 on the client device 120 and display one or more of the promoted media elements, the displayed one or more of the promoted media elements including the media element 110. The media management component 160 may receive a user media selection of the media element 110 and prompt the messaging component 150 to generate the message package 170 comprising the media element 110 in response to the user media selection of the media element 110.

A media repository 505 may comprise a promoted media repository containing promoted media content comprising a plurality of promoted media elements. Promoted media content may correspond to media content used to promote a particular media service, to promote a particular media application, to promote a particular event (e.g., event-related media content such as Thanksgiving media released in the period immediately prior to Thanksgiving), or to promote any other conceivable entity or thing.

Figure 6:
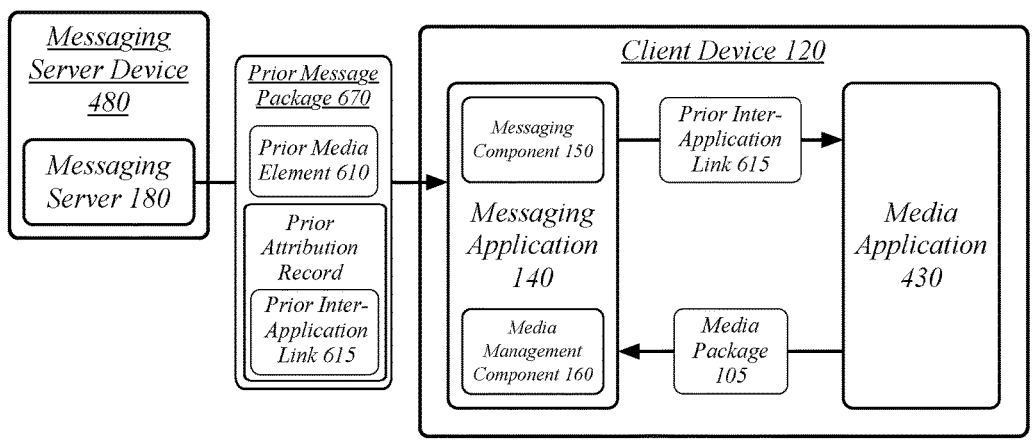
FIG. 6 illustrates an embodiment of the messaging application launching the media application with an inter-application link.

FIG. 6 illustrates an embodiment of the messaging application 140 launching the media application 430 with an inter-application link.

In some cases, the media element 110 may have been selected by the user of the messaging application 140 in the media application 430 in response to receiving a prior media element 610 associated with the media application 430 from another participant in the message thread 210. For example, the user may have been prompted to explore the media content of the media application 430 in response to receiving the prior media element 610 from the media application 430 on the other user's client device via the media messaging system 100 and the messaging application 140.

The message package 170 used to send the media element 110 may be addressed to a destination user account associated with the user that sent the user of the client device 120 the prior media element 610. The message package 170 used to send the media element 110 may be associated with a message thread 210. The messaging component 150 may receive a prior message package 670 from the messaging server 180, the prior messaging package 670 associated with the same message thread with which the message package 170 will be associated. Being associated with the same message thread may comprise being associated with a same message thread identifier or with a same set of user accounts with the media messaging system 100. The prior message package 670 may comprise a prior media element 610, the prior media element 610 associated with the media application 430. The prior message package 670 may comprise a prior attribution record, the prior attribution record comprising a prior inter-application link 615 for the media application 430. The prior inter-application link 615 may identify the prior media element 610 within the media application 430.

The media management component 160 may display the prior media element 610 in the message thread 210 in association with an attribution display element for the media application 430. The media management component 160 may receive a user application launch command in association with the attribution display element and launch the media application 430 in response to the user application launch command. The media management component 160 may transmit the prior inter-application link 615 to the media application 430 to identify the prior media element 610 within the media application 430. The media management component may transmit a message thread inter-application link to the media application 430 in association with the prior inter-application link 615 to empower the media application 430 to identify the message thread 210 prompting the examination of the prior media element 610 and to which any discovered media content should be directed.

The media management component 160 may receive a media package 105 in the messaging application 140 from the media application 430. This media package 105 may comprise the media element 110 and the message thread inter-application link associated with the message thread 210. The media management component 160 may prompt inclusion of the media element 110 in the message thread 210 based on the message thread inter-application link being associated with the message thread 210. The user may then select to use the media element 110 they discovered in the media application 430, may select to discard the media element 110, or may select to remix or combine the media element 110 using the messaging application 140 or another media application.

In some cases, the user may not yet have the media application 430 installed on their client device 120. The media management component 160 may determine that the media application 430 is not installed on the client device 120 upon which the messaging application 140 is executing and initiate installation of the media application 430 on the client device 120 in response to the user application launch command. Initiating installation of the media application 430 may comprise launching an application repository utility on the client device 120 and directing the application repository utility to display an application installation interface empowering the installation of the media application 430. In some embodiments, the media management component 160 may record the installation of the media application 430 in response to the user application launch command in a media application installation attribution record. A media application installation attribution record may help provide statistics regarding the success of media application attribution in driving installation of the media application 430. In some embodiments, the visual control for a user application launch command may differ between when media application 430 is installed and when it is not to indicate to the user whether or not the media application 430 is already available on the client device 120. As such, the messaging application 140 may determine whether the media application 430 is already installed and configure the attribution display element 315 in response.

In some cases, the media application 430 may be used to remix, modify, combine, or otherwise alter a received prior media element 610. The media management component 160 may receive a prior message package 670 from the messaging server 180, the prior message package 670 comprising a prior media element 610, the prior media element 610 associated with a second media application distinct from the media application 430 from which the media package 105 will be received. The media management component 160 may display the prior media element 610. The media management component 160 may display a plurality of remix options. The media management component 160 may receive a user remix command in association with the displayed prior media element 610, the user remix command one of the display plurality of remix options. The media management component 160 may launch the media application 430 in response to the user remix command, transmit the prior media element 610 to the media application 430, and receive the media element 110 from the media application 430 in a media package 105, the media element 110 comprising a modified version of the prior media element 610.

The plurality of remix options may be based on a variety of sources. One or more of the remix options may prompt the use of remixing functions (e.g., filters, overlays, etc.) that are native to the messaging application 140. One or more of the remix options may prompt the use of remixing functions that are imported from a media application 430 while executing within the environment of the messaging application 140. For example, a media application 430 may provide filters (e.g., a color rebalancing filter), overlays (e.g., stickers), audio tracks (e.g., songs), and other remix elements that may be applied by the messaging application 140 itself with the source media application 430 still receiving attribution for the provided remix elements. One or more of the remix options may prompt the direct use of an external media application 430 and launching of the external media application 430.

The media management component 160 may determine a plurality of remix applications based on one or more attributes of the prior media element 610, the plurality of remix applications including the media application 430. The media management component 160 may then display a remix application selection interface empowering selection between the plurality of remix applications, the user remix command comprising a selection of the media application 430 from the plurality of remix applications. Attributes of the prior media element 610 may include a media element type (e.g., image, video, audio), content type (e.g., song, photo, movie clip), and other descriptions of the prior media element 610. Remix applications may be selected as being popular—either generally across users or specific to this user of the messaging application 140—in remixing media elements with some or all of those attributes. Remix applications may be selected as being popular with other users for remixing that particular prior media element 610. The remix application selection interface may display the plurality of remix applications in an application ordering determined according to prior selections of remix applications received from other users of other installations of the messaging application 140.

The user may similarly be shown specific remix options, rather than remix applications. The media management component 160 may receive prior message package 670 from the messaging server 180, the prior message package 670 comprising the prior media element 610, the prior media element 610 associated with the second media application. The media management component 160 may display the prior media element 610. The media management component 160 may receive a user remix command in association with the displayed prior media element 610, display a plurality of remix options in response to the user remix command, wherein each of the remix options corresponds to a different modification to the prior media element 610, receive a user remix option selection of one of the plurality of remix options, and modify the prior media element 610 according to the user remix option selection to produce the media element 110. Some of these remix options may be solely associated with the messaging application 140 and some may be associated with external media applications and therefore be attribution to their respective media application. A selected remix option associated with an external media application may be applied internally by the messaging application 140 or may be applied by the media application 430 via inter-application communication between the messaging application 140 and the media application 430. In some embodiments, each of the displayed plurality of remix options may include a preview of modifying the prior media element 610 according to the plurality of remix options.

Where a media element is the result of remixing, additional information may be passed to the receiving messaging application by the originating messaging application. The media package for a remixed media element may include the original media element (either directly transmitted or through a reference such as a URL), identification (e.g., id numbers, names) for remix elements such as stickers and audio files, as well as the output file of the media element remixing that is the media element being directly shared. As such, a user may receive a remixed media element and perform their own remix using one or more of the elements used in generating the remixed media element. For example, a combined video and sound sample may be transmitted as a unified expression of the combined elements (e.g., video with the sound sample integrated into the audio track), or a reference to the combined elements, for immediate performance in the messaging thread, but with reference to the original elements combined to produce the shared media element. For example, both an original video and an original sound sample may be included or referenced when sharing a video with a sound sample added to it, empowering the receiving user to either place a different sound sample over the same video or to select a different video to modify with the sound sample.

The prior message package 670 may comprise a message thread identifier identifying a message thread 210. This message thread identifier may be transmitted to the media application 430 in association with the transmitted prior media element 610, the message thread identifier corresponding to a inter-application link for the message thread 210. The media management component 160 may receive the message thread identifier from the media application 430 in association with the media element 110 in the media package 105. The media management component 160 may transfer the message thread identifier to the messaging component 150 to empower the messaging component 150 to identify the message thread 210 from the message thread identifier received from the media application 430 and display the media element 110 for inclusion in the message thread 210 based on identifying the message thread 210 from the message thread identifier.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may receive a media element 110 in a messaging application 140, the media element 110 associated with a media application 430 at block 702.

The logic flow 700 may generate a message package 170, the message package 170 comprising the media element 110, the message package 170 comprising an attribution record 115 for the media element, the attribution record comprising an inter-application link for the media element 110 with the media application 430 at block 704.

The logic flow 700 may transmit the message package 170 to a messaging server 180 at block 706.

The embodiments are not limited to this example.

Figure 8:
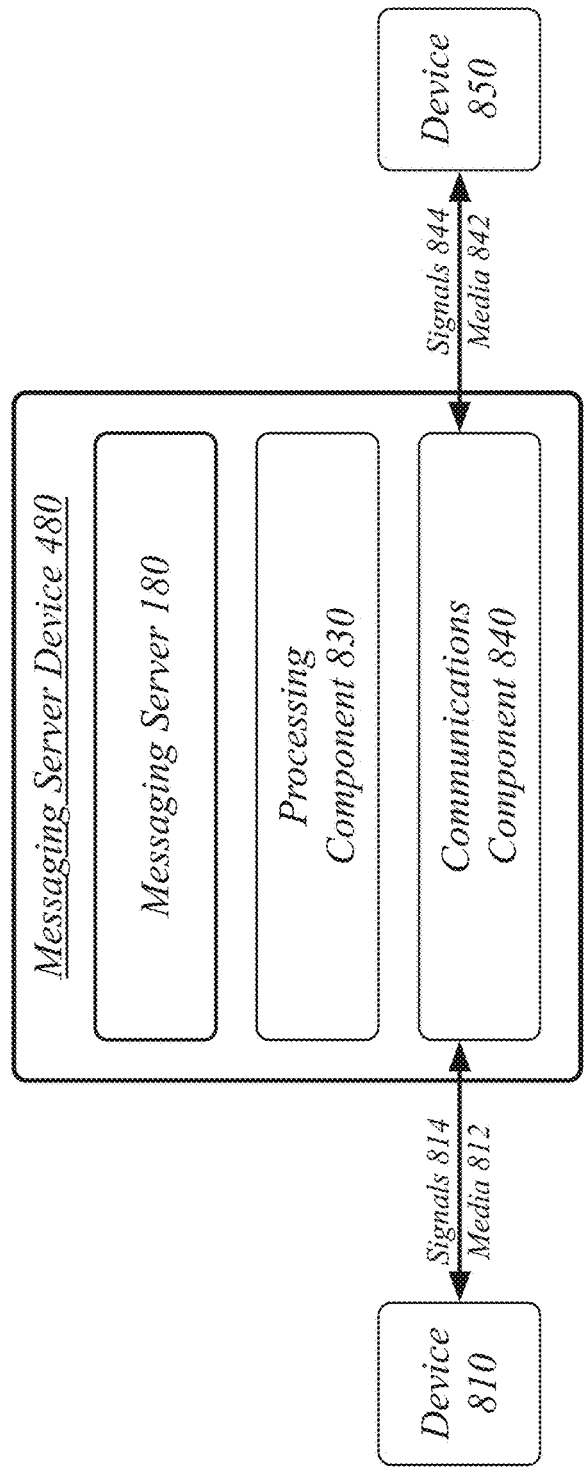
FIG. 8 illustrates an embodiment of a centralized system for the media messaging system of FIG. 1.

FIG. 8 illustrates a block diagram of a centralized system 800. The centralized system 800 may implement some or all of the structure and/or operations for the media messaging system 100 in a single computing entity, such as entirely within a single messaging server device 480.

The messaging server device 480 may comprise any electronic device capable of receiving, processing, and sending information for the media messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The messaging server device 480 may execute processing operations or logic for the media messaging system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The messaging server device 480 may execute communications operations or logic for the media messaging system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The messaging server device 480 may communicate with other devices 810, 850 over a communications media 812, 842, respectively, using communications signals 814, 844, respectively, via the communications component 840. The devices 810, 850 may be internal or external to the messaging server device 480 as desired for a given implementation.

The centralized system 800 may correspond to an embodiment in which a single messaging server 180 is used executing on a single messaging server device 480. The devices 810, 850 may correspond to client devices—such as client device 120 and second client device 190—using the messaging server 180 for messaging services.

Figure 9:
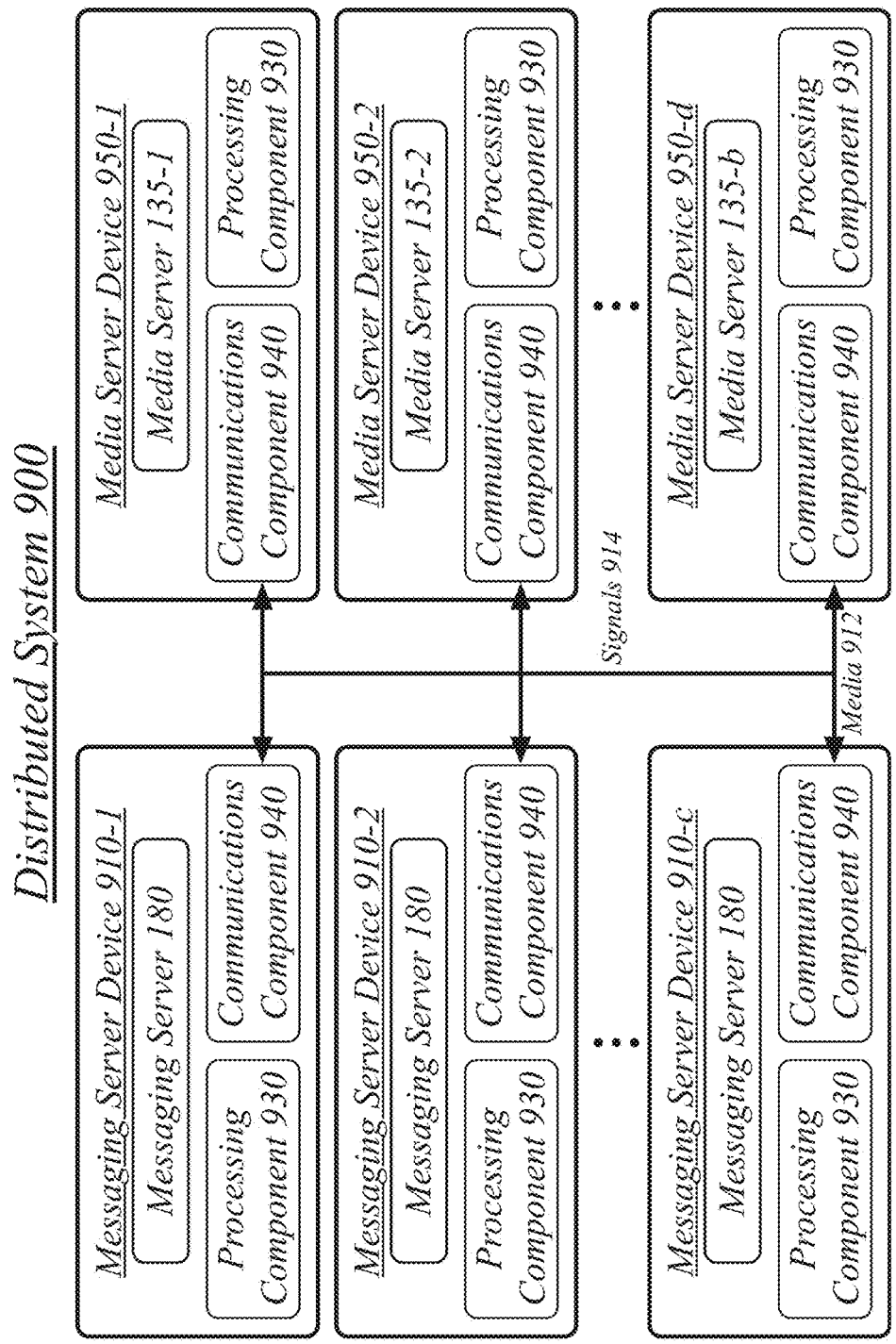
FIG. 9 illustrates an embodiment of a distributed system for the media messaging system of FIG. 1.

FIG. 9 illustrates a block diagram of a distributed system 900. The distributed system 900 may distribute portions of the structure and/or operations for the media messaging system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a plurality of messaging server devices 910 and a plurality of media server devices 950. In general, the plurality of messaging server devices 910 and the plurality of media server devices 950 may be the same or similar to the client messaging server device 480 as described with reference to FIG. 8. For instance, the plurality of messaging server devices 910 and the plurality of media server devices 950 may each comprise a processing component 930 and a communications component 940 which are the same or similar to the processing component 830 and the communications component 840, respectively, as described with reference to FIG. 8. In another example, the devices 910, 950 may communicate over a communications media 912 using communications signals 914 via the communications components 940.

The plurality of messaging server devices 910 may comprise or employ one or more client programs that operate to perform various methodologies in accordance with the described embodiments. In one embodiment, for example, the plurality of messaging server devices 910 may collectively implement the messaging server 180 as a distributed messaging server 180. Each of the messaging server devices 910 may execute a messaging server 180 to collectively provide messaging services to the users of the media messaging system 100.

The plurality of media server devices 950 may comprise or employ one or more server programs that operate to perform various methodologies in accordance with the described embodiments. In one embodiment, for example, the plurality of media server devices 950 may implement the media servers 135.

Figure 10:
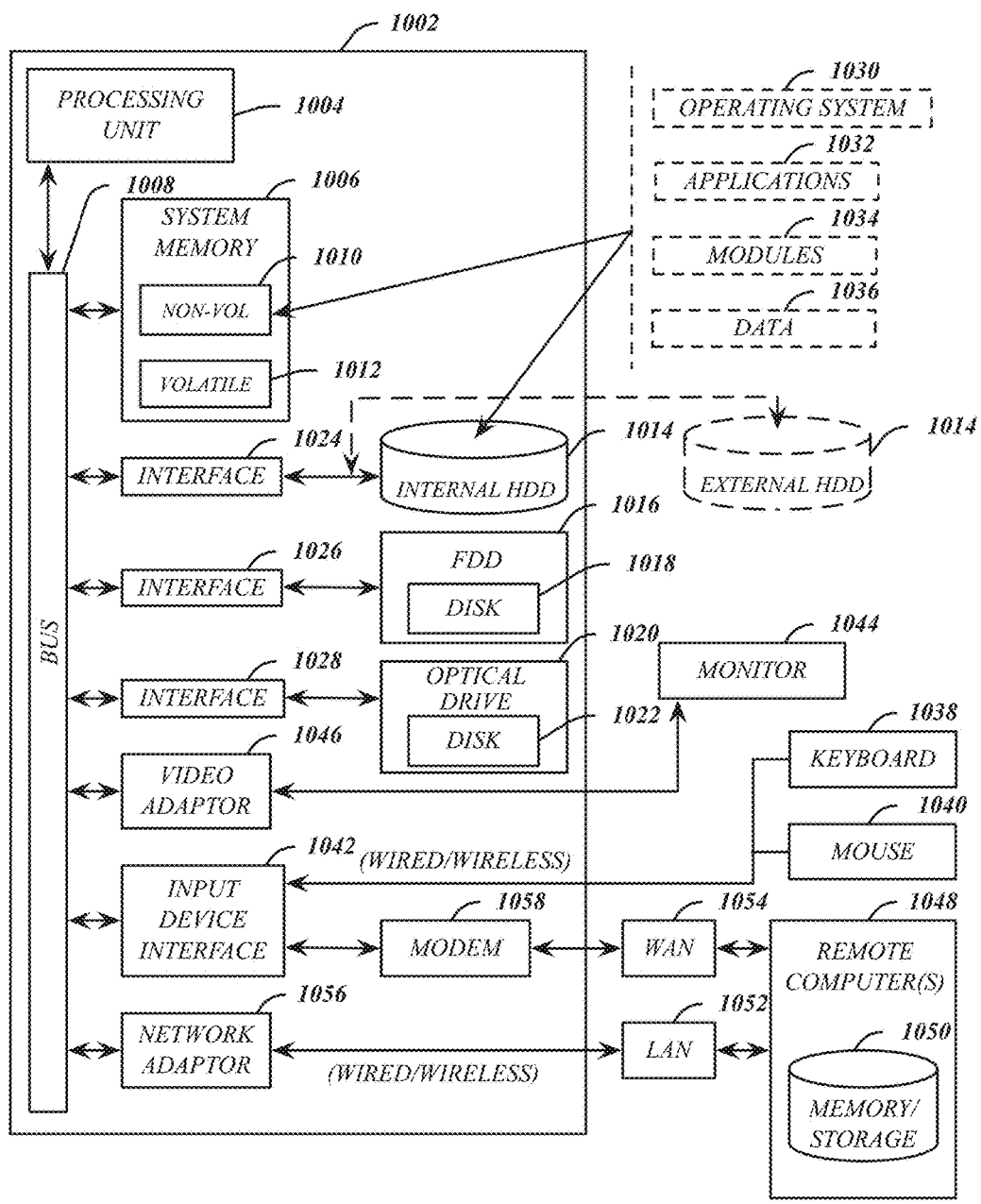
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8 and FIG. 9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the media messaging system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
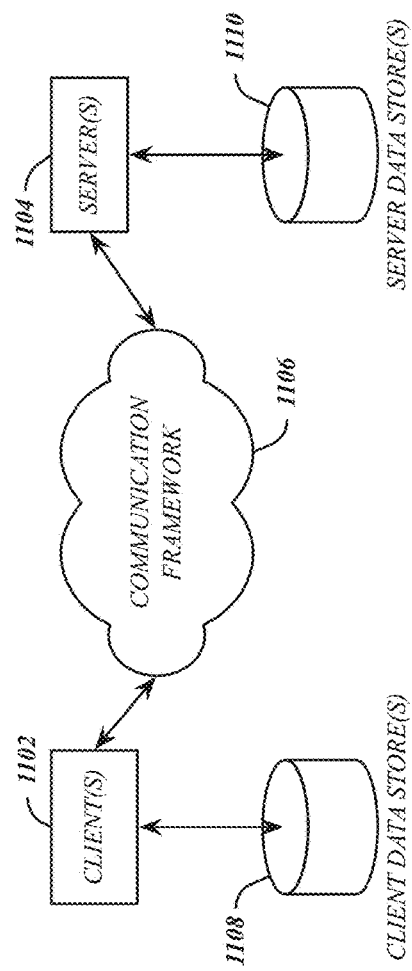
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement client devices such as client device 120, second client device 190, and devices 810, 850. The servers 1104 may implement the messaging server devices 910 and media server devices 950. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
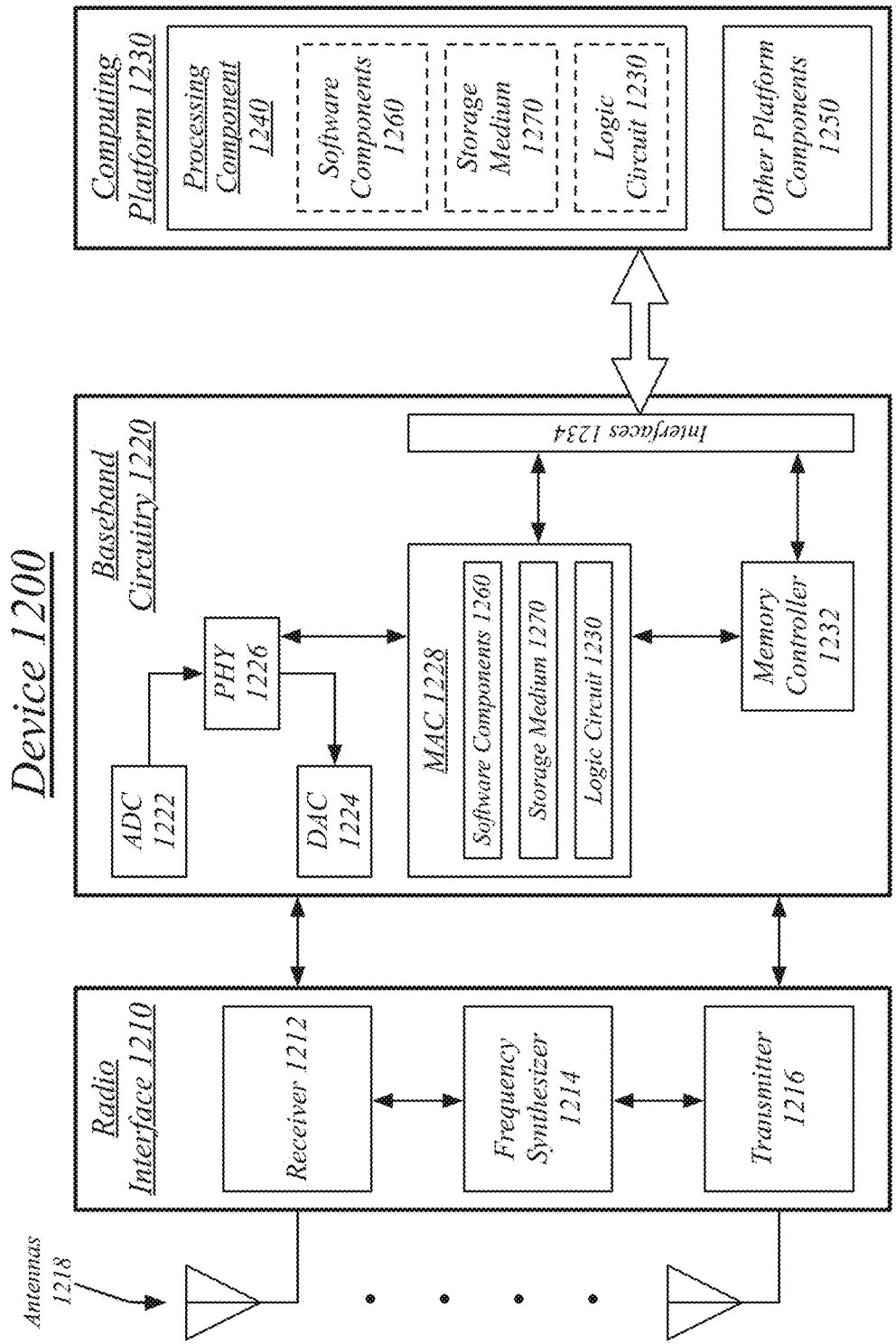
FIG. 12 illustrates an embodiment of a radio device architecture.

FIG. 12 illustrates an embodiment of a device 1200 for use in a multicarrier OFDM system, such as the media messaging system 100. Device 1200 may implement, for example, software components 1260 as described with reference to media messaging system 100 and/or a logic circuit 1230. The logic circuit 1230 may include physical circuits to perform operations described for the media messaging system 100. As shown in FIG. 12, device 1200 may include a radio interface 1210, baseband circuitry 1220, and computing platform 1230, although embodiments are not limited to this configuration.

The device 1200 may implement some or all of the structure and/or operations for the media messaging system 100 and/or logic circuit 1230 in a single computing entity, such as entirely within a single device. Alternatively, the device 1200 may distribute portions of the structure and/or operations for the media messaging system 100 and/or logic circuit 1230 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1256 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames, such as radio frames. Alternatively or in addition, MAC processing circuit 1228 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for the media messaging system 100 and logic circuit 1230 using the processing component 1240. The processing component 1240 (and/or PHY 1226 and/or MAC 1228) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 1202.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a media element in a messaging application, the media element associated with a media application; generating a message package, the message package comprising the media element, the message package comprising an attribution record for the media element, the attribution record comprising an inter-application link for the media element with the media application; and transmitting the message package to a messaging server.

A computer-implemented method may comprise receiving a media element in a messaging application, the media element associated with a media application; generating a message package, the message package comprising the media element, the message package comprising an attribution record for the media element, the attribution record operative to configure a network component for the media application for network access to the media element on a media server; and transmitting the message package to a messaging server.

A computer-implemented method may comprise receiving a media package in a messaging application, the media package associated with a media application, the media package comprising a media service attribution record for a media element; configuring a network component for the messaging application for network access to the media element on a media server based on the media service attribution record; generating a message package, the message package comprising the media element, the message package comprising a media application attribution record for the media element, the media application attribution record comprising an inter-application link for the media element with the media application; and transmitting the message package to a messaging server.

A computer-implemented method may comprise receiving a media package in a messaging application, the media package associated with a media application, the media package comprising a media element and media element metadata, the media element metadata comprising one or more of participant information, topic information, interaction frequency data, topic frequency data, topic popularity data, and user preferences; generating a message package, the message package comprising the media element, the message package comprising an attribution record for the media element, the attribution record comprising an inter-application link for the media element with the media application; and transmitting the message package to a messaging server.

A computer-implemented method may further comprise the messaging application installed on a client device, the media application installed on the client device as a distinct application from the messaging application, further comprising: receiving a media package in the messaging application from the media application via inter-application communication on the client device, the media package comprising the media element and the inter-application link.

A computer-implemented method may further comprise receiving a user media selection of the media element in the media application; receiving a user media sharing command in the media application; and transmitting the media package from the media application to the messaging application in response to the user media selection and user media sharing command.

A computer-implemented method may further comprise extracting the media element from the received media package; displaying a preview of the media element in the messaging application; receiving a user media selection of the media element in the messaging application; and generating the message package comprising the media element in response to the user media selection of the media element within the messaging application.

A computer-implemented method may further comprise receiving a promoted media repository from a media server, the promoted media repository comprising a plurality of promoted media elements, the media element comprising one of the plurality of promoted media elements; displaying one or more of the promoted media elements, the displayed one or more of the promoted media elements including the media element; receiving a user media selection of the media element; and generating the message package comprising the media element in response to the user media selection of the media element.

A computer-implemented method may further comprise displaying the media element in a media element discovery section of the messaging application; receiving a user media selection of the media element in the media element discovery section; and generating the message package comprising the media element in response to the user media selection of the media element.

A computer-implemented method may further comprise displaying the media element in a previously-exchanged media element section of the messaging application; receiving a user media selection of the media element in the previously-exchange media element section; and generating the message package comprising the media element in response to the user media selection of the media element.

A computer-implemented method may further comprise displaying the media element in an application-specific media element section of the messaging application, the application-specific media element section associated with the media application; receiving a user media selection of the media element in the application-specific media element section; and generating the message package comprising the media element in response to the user media selection of the media element.

A computer-implemented method may further comprise the message package associated with a message thread, further comprising: receiving a prior message package from the messaging server, the prior messaging package associated with the message thread, the prior message package comprising a prior media element, the prior media element associated with the media application, the prior message package comprising a prior attribution record, the prior attribution record comprising a prior inter-application link, the prior inter-application link identifying the prior media element within the media application; displaying the prior media element in the message thread in association with an attribution display element for the media application; receiving a user application launch command in association with the attribution display element; launching the media application in response to the user application launch command; transmitting the prior inter-application link to the media application; transmitting a message thread inter-application link to the media application in association with the prior inter-application link; receiving a media package in the messaging application from the media application, the media package comprising the media element and the message thread inter-application link associated with the message thread; and prompt inclusion of the media element in the message thread based on the message thread inter-application link being associated with the message thread.

A computer-implemented method may further comprise the messaging application executing on a client device, further comprising: determining that the media application is not installed on the client device; and initiating installation of the media application on the client device in response to the user application launch command.

A computer-implemented method may further comprise wherein initiating installation of the media application comprises launching an application repository utility on the client device and directing the application repository utility to display an application installation interface empowering installation of the media application.

A computer-implemented method may further comprise recording the installation of the media application in response to the user application launch command in a media application installation attribution record.

A computer-implemented method may further comprise receiving a prior message package from the messaging server, the prior message package comprising a prior media element, the prior media element associated with a second media application; displaying the prior media element; receiving a user remix command in association with the displayed prior media element; launching the media application in response to the user remix command; transmitting the prior media element to the media application; and receiving the media element from the media application, the media element comprising a modified version of the prior media element.

A computer-implemented method may further comprise determining a plurality of remix applications based on one or more attributes of the prior media element, the plurality of remix applications including the media application; and displaying a remix application selection interface empowering selection between the plurality of remix applications, the user remix command comprising a selection of the media application from the plurality of remix applications.

A computer-implemented method may further comprise the remix application selection interface displaying the plurality of remix applications in an application ordering determined according to prior selections of remix applications received from other users of other installations of the messaging application.

A computer-implemented method may further comprise receiving a prior message package from the messaging server, the prior message package comprising a prior media element, the prior media element associated with a second media application; displaying the prior media element; receiving a user remix command in association with the displayed prior media element; displaying a plurality of remix options in response to the user remix command, wherein each of the remix options corresponds to a different modification to the prior media element; receiving a user remix option selection of one of the plurality of remix options; and modifying the prior media element according to the user remix option selection to produce the media element.

A computer-implemented method may further comprise wherein each of the displayed plurality of remix options includes a preview of modifying the prior media element according to the plurality of remix options.

A computer-implemented method may further comprise the prior message package comprising a message thread identifier identifying a message thread, transmitting the message thread identifier to the media application in association with the transmitted prior media element, further comprising: receiving the message thread identifier from the media application in association with the media element; identifying the message thread from the message thread identifier received from the media application; and displaying the media element for inclusion in the message thread based on identifying the message thread from the message thread identifier.

An apparatus may comprise a processor circuit on a device; a media management component operative on the processor circuit to receive a media element in a messaging application, the media element associated with a media application; a messaging component operative to generate a message package, the message package comprising the media element, the message package comprising an attribution record for the media element, the attribution record comprising an inter-application link for the media element with the media application; and transmit the message package to a messaging server. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving, in a messaging application installed on a client device, a media package from a media application installed on the client device as a distinct application from the messaging application, the media package comprising a media element associated with the media application and an attribution record for the media element, the attribution record comprising an inter-application link identifying the media element within a content space of the associated media application, the media package being received in the messaging application via inter-application communication on the client device between the messaging application and the media application;
generating a message package in the messaging application at the client device, the message package comprising the media package; and
transmitting the message package to a messaging server.

2. The method of claim 1, further comprising:
extracting the media element from the received media package;
displaying a preview of the media element in the messaging application;

receiving a user media selection of the media element in the messaging application; and generating the message package in response to the user media selection of the media element within the messaging application.

3. The method of claim 1, further comprising:

receiving a promoted media repository from a media server, the promoted media repository comprising a plurality of promoted media elements, the media element comprising one of the plurality of promoted media elements;

displaying one or more of the promoted media elements, the displayed one or more of the promoted media elements including the media element;

receiving a user media selection of the media element; and generating the message package in response to the user media selection of the media element.

4. The method of claim 1, further comprising:

displaying the media element in a media element discovery section of the messaging application;

receiving a user media selection of the media element in the media element discovery section; and generating the message package in response to the user media selection of the media element.

5. The method of claim 1, the message package associated with a message thread corresponding to a private messaging conversation, further comprising:

receiving a prior message package from the messaging server, the prior message package associated with the message thread, the prior message package comprising a prior media element, the prior media element associated with the media application, the prior message package comprising a prior attribution record, the prior attribution record comprising a prior inter-application link, the prior inter-application link identifying the prior media element within the media application;

displaying the prior media element in the message thread in association with an attribution display element for the media application;

receiving a user application launch command in association with the attribution display element;

launching the media application in response to the user application launch command;

transmitting the prior inter-application link to the media application;

transmitting a message thread inter-application link to the media application in association with the prior inter-application link;

receiving a media package in the messaging application from the media application, the media package comprising the media element and the message thread inter-application link associated with the message thread; and prompting inclusion of the media element in the message thread based on the message thread inter-application link being associated with the message thread.

6. The method of claim 5, the messaging application executing on a client device, further comprising:

determining that the media application is not installed on the client device; and initiating installation of the media application on the client device in response to the user application launch command.

7. The method of claim 1, further comprising:

receiving a prior message package from the messaging server, the prior message package comprising a prior media element, the prior media element associated with a second media application;

displaying the prior media element;

receiving a user remix command in association with the displayed prior media element;

launching the media application in response to the user remix command;

transmitting the prior media element to the media application; and receiving the media element from the media application, the media element comprising a modified version of the prior media element.

8. An apparatus, comprising:

a processor circuit on a device;

a media management component operative on the processor circuit to receive a media package from a media application in a messaging application installed on the device as a distinct application from the media application, the media package comprising a media element associated with the media application and an attribution record for the media element, the attribution record comprising an inter-application link identifying the media element within a content space of the associated media application the media package being received in the messaging application via inter-application communication on the client device between the messaging application and the media application; and a messaging component operative on the processor circuit to generate a message package on the device, the message package comprising the media package; and transmit the message package to a messaging server.

9. The apparatus of claim 8, further comprising:

the media management component operative to receive a promoted media repository from a media server, the promoted media repository comprising a plurality of promoted media elements, the media element comprising one of the plurality of promoted media elements; display one or more of the promoted media elements, the displayed one or more of the promoted media elements including the media element; and receive a user media selection of the media element; and the messaging component operative to generate the message package comprising the media element in response to the user media selection of the media element.

10. The apparatus of claim 8, the message package associated with a message thread corresponding to a private messaging conversation, further comprising:

the messaging component operative to receive a prior message package from the messaging server, the prior message package associated with the message thread, the prior message package comprising a prior media element, the prior media element associated with the media application, the prior message package comprising a prior attribution record, the prior attribution record comprising a prior inter-application link, the prior inter-application link identifying the prior media element within the media application;

the media management component operative to display the prior media element in the message thread in association with an attribution display element for the media application; receive a user application launch command in association with the attribution display element; launch the media application in response to the user application launch command; transmit the prior inter-application link to the media application; transmit a message thread inter-application link to the media application in association with the prior inter-application link; receive a media package in the messaging application from the media application, the media package comprising the media element and the message thread inter-application link associated with the message thread; and prompt inclusion of the media element in the message thread based on the message thread inter-application link being associated with the message thread.

11. The apparatus of claim 8, further comprising:
the media management component operative to determine that the media application is not installed on the device; and initiate installation of the media application on the device in response to the user application launch command.

12. The apparatus of claim 8, further comprising:
the messaging component operative to receive a prior message package from the messaging server, the prior message package comprising a prior media element, the prior media element associated with a second media application;
the media management component operative to display the prior media element; receive a user remix command in association with the displayed prior media element; launch the media application in response to the user remix command; transmit the prior media element to the media application; and receive the media element from the media application, the media element comprising a modified version of the prior media element.

13. At least one non-transitory computer-readable storage medium comprising instructions that, when executed, cause a system to:
receive a media package from a media application in a messaging application installed on a client device as a distinct application from the media application, the media package comprising a media element associated with the media application and an attribution record for the media element, the attribution record comprising an inter-application link identifying the media element within a content space of the associated media application, the media package being received in the messaging application via inter-application communication on the client device between the messaging application and the media application;
generate a message package at the client device, the message package comprising the media package; and
transmit the message package to a messaging server.

14. The computer-readable storage medium of claim 13, comprising further instructions that, when executed, cause a system to:
receive a promoted media repository from a media server, the promoted media repository comprising a plurality of promoted media elements, the media element comprising one of the plurality of promoted media elements;
display one or more of the promoted media elements, the displayed one or more of the promoted media elements including the media element;
receive a user media selection of the media element; and
generate the message package comprising the media element in response to the user media selection of the media element.

15. The computer-readable storage medium of claim 13, the message package associated with a message thread corresponding to a private messaging conversation, comprising further instructions that, when executed, cause a system to:

receive a prior message package from the messaging server, the prior messaging package associated with the message thread, the prior message package comprising a prior media element, the prior media element associated with the media application, the prior message package comprising a prior attribution record, the prior attribution record comprising a prior inter-application link, the prior inter-application link identifying the prior media element within the media application;
display the prior media element in the message thread in association with an attribution display element for the media application;
receive a user application launch command in association with the attribution display element;
launch the media application in response to the user application launch command;
transmit the prior inter-application link to the media application;
transmit a message thread inter-application link to the media application in association with the prior inter-application link;
receive a media package in the messaging application from the media application, the media package comprising the media element and the message thread inter-application link associated with the message thread; and
prompt inclusion of the media element in the message thread based on the message thread inter-application link being associated with the message thread.

16. The computer-readable storage medium of claim 13, the messaging application executing on a client device, comprising further instructions that, when executed, cause a system to:
determine that the media application is not installed on the client device; and
initiate installation of the media application on the client device in response to the user application launch command.

17. The computer-readable storage medium of claim 13, comprising further instructions that, when executed, cause a system to:
receive a prior message package from the messaging server, the prior message package comprising a prior media element, the prior media element associated with a second media application;
display the prior media element;
receive a user remix command in association with the displayed prior media element;
launch the media application in response to the user remix command;
transmit the prior media element to the media application; and
receive the media element from the media application, the media element comprising a modified version of the prior media element.

18. A computer-implemented method, comprising:
receiving a media package from a media application in a messaging application installed on a client device, the media package associated with the media application installed on the client device as a distinct application from the messaging application, the media package comprising a media element associated with the media application and an attribution record for the media element, the attribution record comprising an inter-application link identifying the media element within a content space of the associated media application;

generating a message package in the messaging application at the client device, the message package comprising the media package and media element metadata, the media element metadata comprising one or more of participant information, topic information, interaction frequency data, topic frequency data, topic popularity data, and user preferences; and transmitting the message package to a messaging server.

* * * * *